(12) United States Patent
Hicks et al.

(10) Patent No.: US 9,747,632 B2
(45) Date of Patent: Aug. 29, 2017

(54) STORE MOBILE CLOUD APPLICATION SYSTEM FOR INVENTORY MANAGEMENT AND CUSTOMER ORDER FULFILLMENT AND METHOD FOR RETAIL ESTABLISHMENT

(71) Applicant: Retail Technologies Corporation, Orlando, FL (US)

(72) Inventors: Bruce J. Hicks, Windermere, FL (US); Brian K. McWhirter, Winter Garden, FL (US); DeVan McArthur, Gulf Breeze, FL (US); Bromley Williams, Orlando, FL (US)

(73) Assignee: Retail Technologies Corporation, Orlando, FL (US)

( * ) Notice: Subject to any disclaimer, the term of this patent is extended or adjusted under 35 U.S.C. 154(b) by 0 days.

(21) Appl. No.: 13/783,127

(22) Filed: Mar. 1, 2013

(65) Prior Publication Data

US 2014/0249947 A1 Sep. 4, 2014
US 2017/0083968 A9 Mar. 23, 2017

Related U.S. Application Data

(60) Provisional application No. 61/751,911, filed on Jan. 13, 2013.

(51) Int. Cl.
*G06Q 30/06* (2012.01)
(52) U.S. Cl.
CPC .............................. *G06Q 30/0641* (2013.01)
(58) Field of Classification Search
USPC ........................................................ 705/21
See application file for complete search history.

(56) References Cited

U.S. PATENT DOCUMENTS

| 5,324,922 A | 6/1994 | Roberts ......................... 235/375 |
| 6,853,293 B2 | 2/2005 | Swartz et al. ............... 340/5.92 |
| 7,010,501 B1 | 3/2006 | Roslak et al. .................. 705/23 |

(Continued)

OTHER PUBLICATIONS

"PAYware Mobile Enterprise" found at http://www.verifone.com/products/hardware/mobile/payware-mobile-enterprise.

(Continued)

*Primary Examiner* — Garcia Ade
(74) *Attorney, Agent, or Firm* — Ernest D. Buff & Associates, LLC; Margaret A. LaCroix; Ernest D. Buff

(57) ABSTRACT

A store mobile cloud application system executes a retail store purchasing system having plurality of barcode scanners and scan guns integrated with a mobile tablet device carried by employees. The mobile tablet device is rotatably attached to a base housing directly below it connected by a base mount universal receiver with rotatable coupling. The Main PCB has an EEPROM controlling operations of the USB devices including the scanner and an MSR. The mobile tablet device has mobile applications which allow wireless communication with a POS store systems server and the corporate ERP system, and also commands the EEPROM. Scanned data involving a product to be purchased is received by the mobile tablet device and sent wirelessly to the POS store systems server to obtain product data. The allocation of inventory sold, but not available in the store, are processed real-time through the corporate ERP system and available for review chain-wide.

15 Claims, 21 Drawing Sheets

(56) References Cited

U.S. PATENT DOCUMENTS

| | | | |
|---|---|---|---|
| 7,913,912 B2 | 3/2011 | Do et al. | 235/472.01 |
| 8,235,289 B2 | 8/2012 | Hsu et al. | 235/383 |
| 8,235,294 B2 | 8/2012 | Miller et al. | 235/472.02 |
| 8,250,187 B2 | 8/2012 | Cacheria, III et al. | 709/221 |
| 8,255,499 B2 | 8/2012 | Cacheria, III et al. | 709/221 |
| 8,255,500 B2 | 8/2012 | Cacheria, III et al. | 709/221 |
| 2005/0213298 A1 | 9/2005 | Doherty et al. | 361/679.44 |
| 2007/0007331 A1* | 1/2007 | Jasper | G06Q 20/20 235/379 |
| 2007/0040026 A1* | 2/2007 | Vleet | G06Q 20/20 235/383 |
| 2011/0125566 A1* | 5/2011 | McLaughlin | G06Q 20/20 705/14.23 |
| 2011/0231272 A1 | 9/2011 | Englund et al. | 705/21 |
| 2012/0016758 A1 | 1/2012 | Bouaziz et al. | 705/17 |
| 2012/0072350 A1 | 3/2012 | Goldthwaite et al. | 705/44 |
| 2012/0109761 A1 | 5/2012 | Roquemore | 705/17 |
| 2012/0209749 A1 | 8/2012 | Hammad et al. | 705/27.1 |
| 2012/0284131 A1 | 11/2012 | Soffer et al. | 705/17 |
| 2012/0296679 A1 | 11/2012 | Im | 705/5 |
| 2012/0296741 A1 | 11/2012 | Dykes | 705/14.53 |
| 2012/0298740 A1 | 11/2012 | Hsu et al. | 235/375 |
| 2013/0030933 A1 | 1/2013 | Talach et al. | 705/17 |
| 2013/0151358 A1 | 6/2013 | Ramalingam | 705/16 |
| 2013/0232083 A1* | 9/2013 | Smith | G06Q 20/3278 705/67 |
| 2013/0256403 A1 | 10/2013 | Mackinnon | 235/375 |

OTHER PUBLICATIONS

"Infinite Peripherals IPC_Infinea_Tab_Spec.pdf" found at http://www.ipclineapro.com/infinea-tab-ipad/.

* cited by examiner

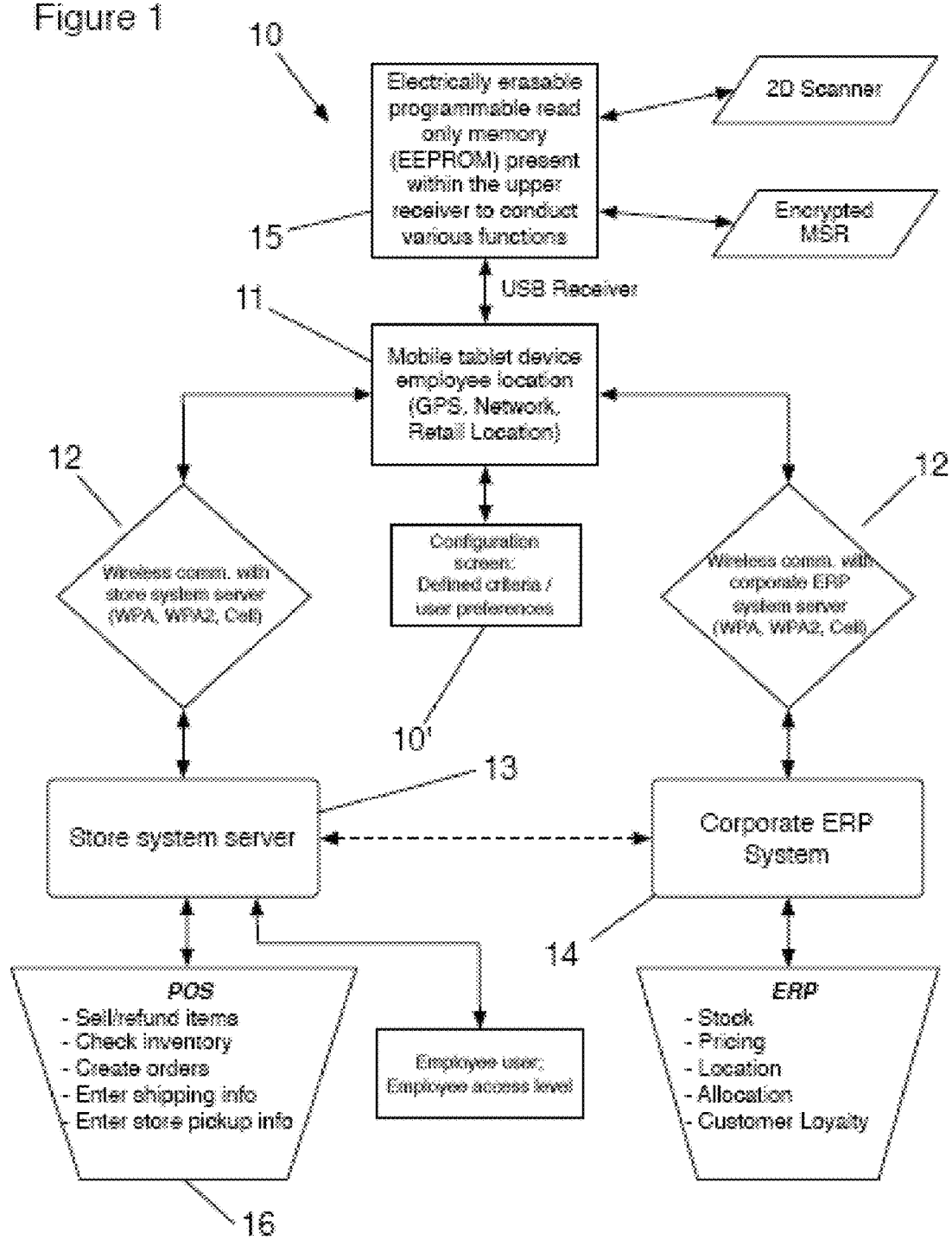

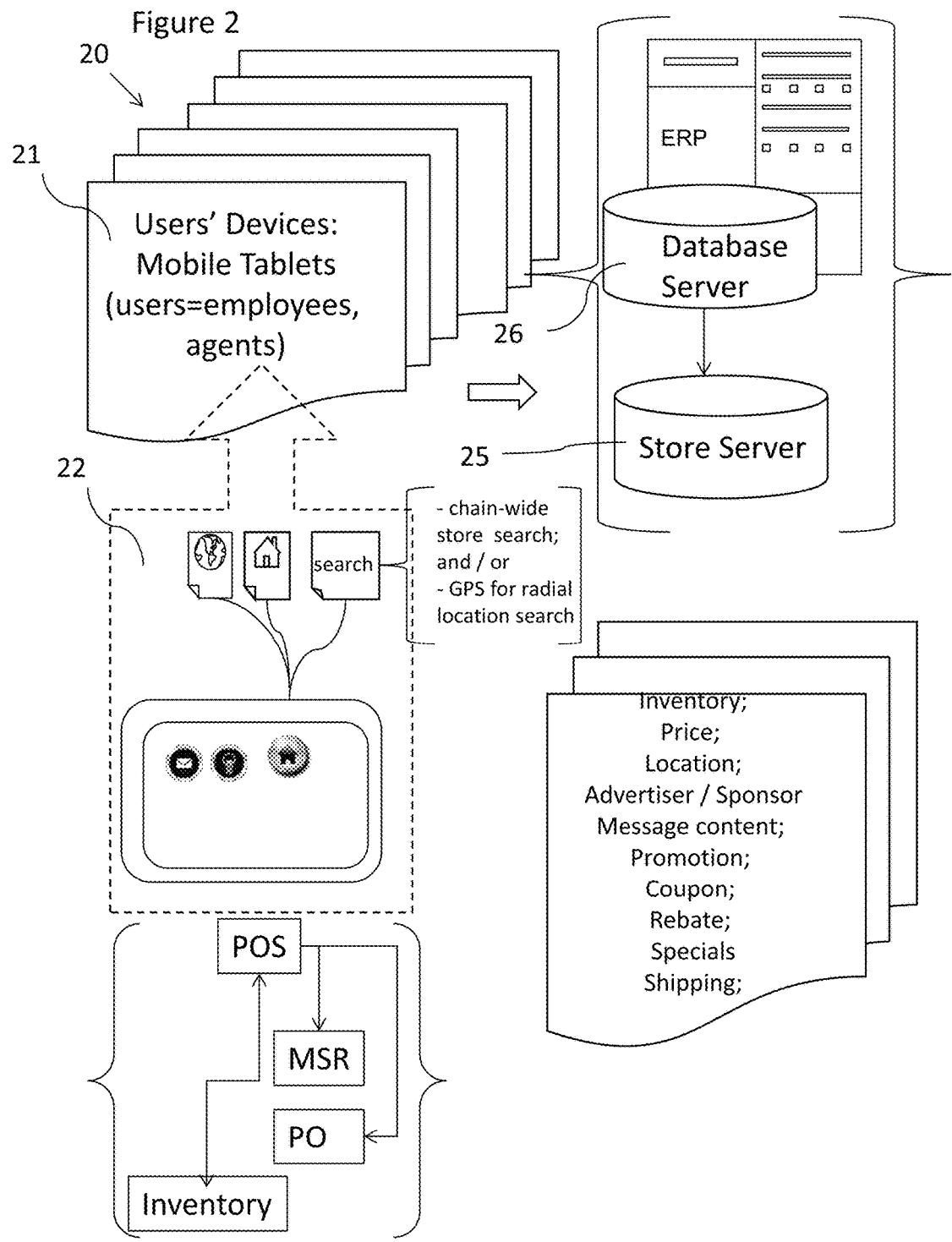

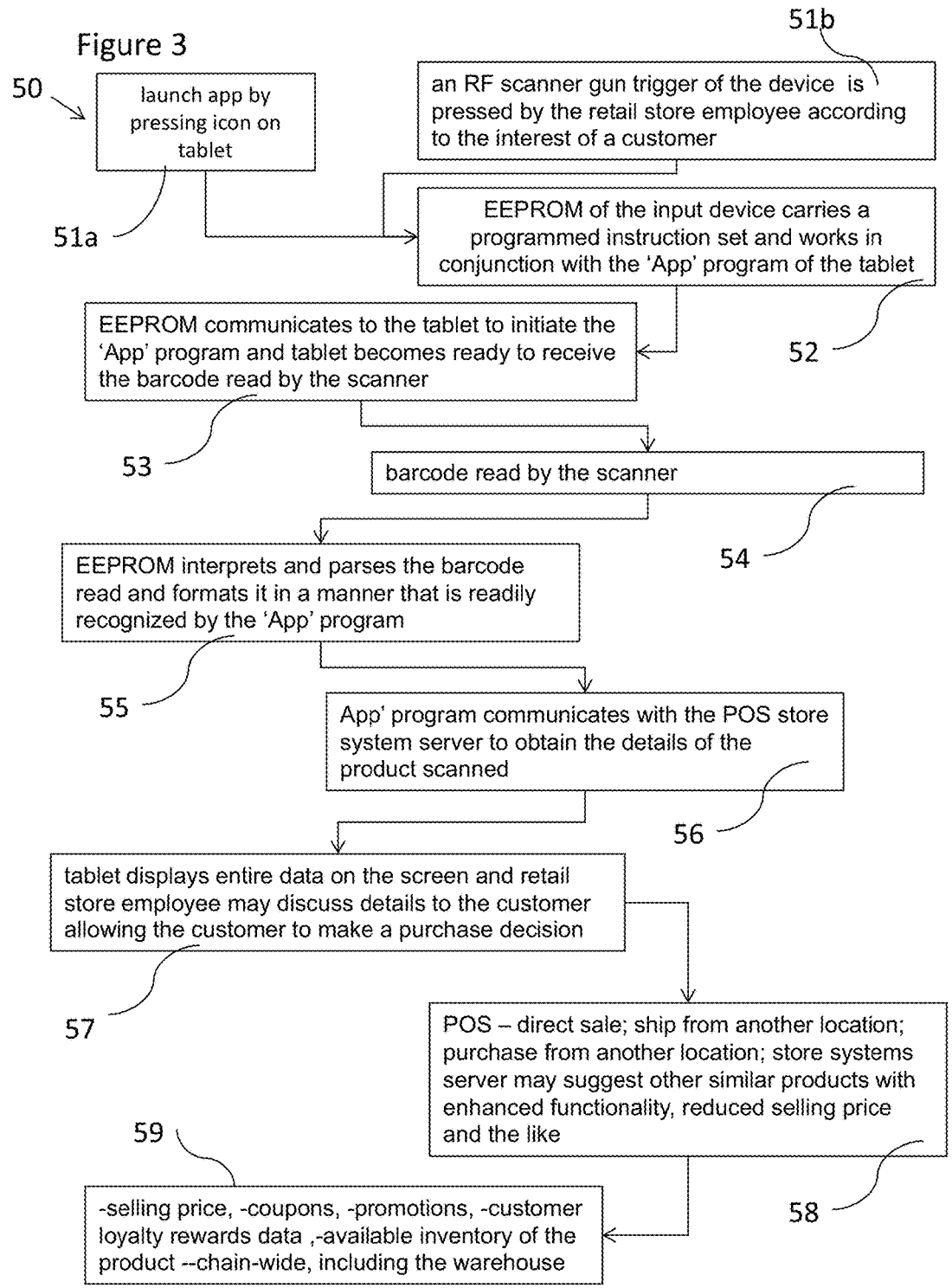

Figure 10
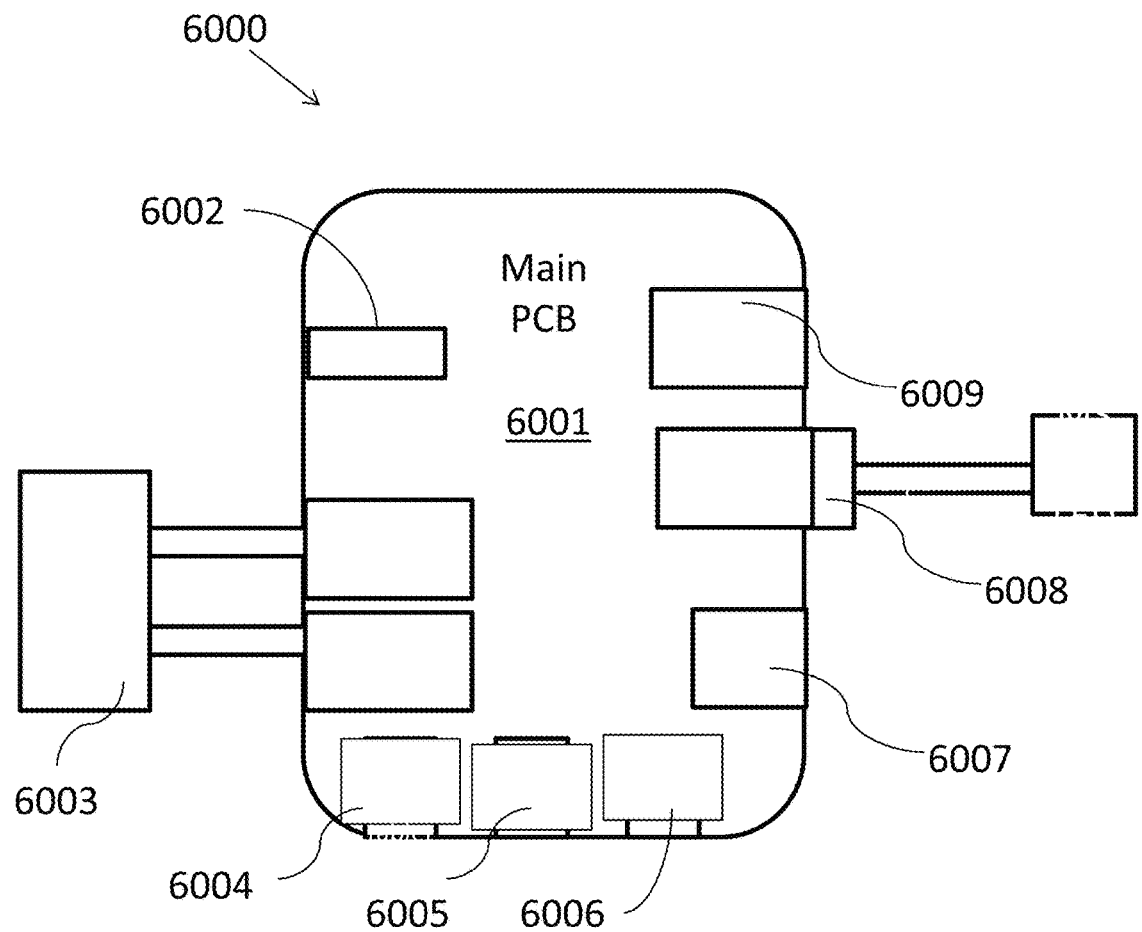
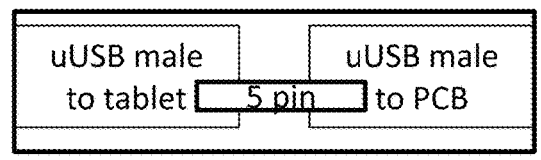
*All connectors are females on PCB

| Scan or enter an item | Find | Store: 1 | | Terminal: 91 |
|---|---|---|---|---|
| Customer Information | | | Functions | |
| ANSER F ISOFORCE P  1  119.00 | | Customer Lookup | Discount Transact. | Void Transact. |
| Discount: 0.00  Taxable: YES  Qty: 1.00 | | | | |
| LEATHER  2  24.99 | | Inventory Lookup | | |
| Discount: 0.00  Taxable: YES  Qty: 1.00 | | | | |
| HAWKEYE TTN DRVR  3  99.99 | | | | |
| Discount: 0.00  Taxable: YES  Qty: 1.00 | | | | |
| | | Flash Sales | Reprint Receipt | Refund |
| Subtotal  Tax  Total | | Total Sales | | Logout |
| 243.98  14.64  258.62 | | | | |

Billed To:

REGULAR SALE

Store Number: 1 Cashier: 0023 - rtc
2013/01/15 09:00:53 REG091 TILL023 TRN21

| Item Number | Description | Quantity | Unit Price | Total Price |
|---|---|---|---|---|
| 22879 | FG:Crayon Sweet Tr | 1 | 2.95 | 2.95 |

| | |
|---|---|
| TOTAL DISCOUNTS | 0.00 |
| SUBTOTAL | 2.95 |
| TOTAL TAX 6% | 0.18 |
| TOTAL | 3.13 |
| VISA | 3.13 |

Store Pickups

22879 FG:Crayon Sweet Tr (Qty: 1)

Store
(407) 352-5607
2345 South Ave
Windermere, FL 32720

Track your order here

Retain Receipt for Refund or Exchange
Visit us at www.mequalarion.com
Thank You and Come Again

1800

STORE MOBILE CLOUD APPLICATION SYSTEM FOR INVENTORY MANAGEMENT AND CUSTOMER ORDER FULFILLMENT AND METHOD FOR RETAIL ESTABLISHMENT

CROSS-REFERENCE TO RELATED APPLICATIONS

This Nonprovisional Patent Application is related to Applicant's U.S. Nonprovisional Application entitled "Mobile Scanner Gun System With Mobile Tablet Having A Mobile Pos And Enterprise Resource Planning Application For Pos Customer Order Fulfillment And In Store Inventory Management For Retail Establishment" U.S. Ser. No. 13/783,058, filed Mar. 1, 2013; U.S. Nonprovisional Application entitled "Mobile Barcode Scanner Gun System With Mobile Tablet Device Having A Mobile Pos And Enterprise Resource Planning Application For Customer Checkout/Order Fulfillment And Real Time In Store Inventory Management For Retail Establishment" U.S. Ser. No. 13/783,089, filed Mar. 1, 2013, now U.S. Pat. No. 8,856,033, issued Oct. 7, 2014; U.S. Nonprovisional Application entitled "Wearable Mobile Scanner System With Mobile Tablet Having A Mobile Pos And Enterprise Resource Planning Application For Pos Customer Order Fulfillment And Method In Store Inventory Management For Retail Establishment" U.S. Ser. No. 13/783,110, filed Mar. 1, 2013, now U.S. Pat. No. 9,092,765, issued Jul. 28, 2015; and U.S. Nonprovisional Application entitled "Wearable Mobile Scanner System With Mobile Tablet Having A Mobile Pos And Enterprise Resource Planning Application For Pos Customer Order Fulfillment And In Store Inventory Management For Retail Establishment" U.S. Ser. No. 13/783,119, filed Mar. 1, 2013, now U.S. Pat. No. 8,972,283, issued Mar. 3, 2015; which Nonprovisional applications are co-pending and filed on the same date herewith, and the disclosures of which co-pending Nonprovisional applications are hereby specifically incorporated herein by reference thereto.

This Nonprovisional patent application claims the benefit of the filing date for U.S. Provisional Application No. 61/751,911, filed Jan. 13, 2013, the disclosure of which is hereby specifically incorporated in its entirety by reference thereto.

FIELD OF THE INVENTION

The present invention relates to Internet messaging systems and methods concerning sales transactions; and, more particularly to retail store mobile cloud application system shown on a display on a Smartphone, tablet or mobile device, or stationary device, having Internet connectivity for use in retail establishments.

DESCRIPTION OF THE PRIOR ART

Current retail systems utilize various types of barcode readers, tablets, register stations and Point-of-Sale (POS) devices. For example, one particularly common type of barcode reading device is that used at the checkout register or register station of a store, displaying the price of an item to the checkout clerk, who can then process the sale. Other frequently utilized barcode reading devices can be found at various kiosks in a store wherein a customer can scan an item for a price-check, however these kiosk barcode reading devices do not process the sale, and only provide the ability to view the price of the item scanned. Generally, the checkout counter or register station is in a central location and customers typically must line up at the checkout register bringing with them all the products to be purchased. As the register stations are the only means for the POS transaction, customers are required to wait, often in a line, to checkout via either self-checkout at a register station or at a traditional check-out register operated by an employee of the retail establishment. However, these bar code scanning devices and software implemented therein, fail to provide a combination of mobile technology with POS technology, and further fail to provide the ability to manage inventory throughout the retailer's franchise.

Another type of barcode reading device is a mobile handheld scanner, which is used by store and warehouse associates to manage inventory tasks such as physical inventory, cycle counting, inventory receiving, store to store transfers, return to vendor and product ticketing. However, these devices are only used for inventory management and have no ability to process sales.

Various systems and devices heretofore disclosed and utilized are set forth hereinafter.

U.S. Pat. No. 6,853,293 to Swartz et al. discloses a wearable communication system. A portable data input or computer system includes an input/output device such as a keyboard and a display, as well as another data input device such as an optical barcode scanner, and a data processor module. To scan barcode type indicia, the operator points the scanner at the barcode and triggers the scanner to read the indicia. Each of the system components is distributed on an operator's body and collectively forms a personal area system (PAS). Components may include a scanner or imager, a wrist unit, a headpiece including an eyepiece display, speaker and a microphone. Components within a particular PAS communicate with each other over a personal area network (PAN). Individual PASs may be combined into a network of PASs called a PAS cluster. PASs in a particular PAS cluster can communicate with each other over another wireless communication channel. Individual PAS can gain access to a Local Area Network (LAN) and/or a Wide Area Network (WAN) via an access point. Individual PASs can use devices, such as servers and PCs situated either on the LAN or the WAN to retrieve and exchange information. Individual PAS components can provide automatic speech and image recognition. PAS components may also act a telephone, a pager, or any other communication device having access to a LAN or a WAN. Transmission of digitized voice and/or video data can be achieved over an Internet link. The wearable communication system has a CPU and communicates by wireless communication with a trigger worn elsewhere. No tablet is provided, and the system does not communicate barcode information or payment card information wirelessly to a main computer in a retail environment.

U.S. Pat. No. 7,010,501 to Roslak et al. discloses a personal shopping system. The personal shopping system is designed for combined use in both the home of a user and a shopping establishment. The system includes a host computer which is coupled to a host modem and, optionally, to at least one wireless multi-access point. The portable terminal can be used in both the shopping establishment and the home of the user. It is configured to read barcodes associated with items related to shopping, and includes a memory, a barcode reader, a wireless transceiver, and a data interface. The data interface of the terminal communicates with a data interface of the shopping establishment kiosk cradle or directly with the shopping establishment's communications network. This portable terminal communicates with a kiosk and has a very limited range of communication. The portable terminal has a barcode scanner but does not transmit scanned barcode data to a central corporate ERP system in the retail shopping establishment. Moreover, the portable terminal does not have a tablet or an input device, and does not accept swiping of a magnetic payment card.

U.S. Pat. No. 7,913,912 to Do et al. discloses on-demand point-of-sale scanner access. The access system associates or disassociates a mobile point-of-sale scanner device with a particular shopper. Shoppers may be identified, for example, using biometrics or by scanning a loyalty card. As an example of using biometrics, the shopper's fingerprint may be scanned at the same time as a trigger of the scanner is activated to scan an item's barcode. The fingerprint is preferably transmitted, along with the scanned barcode, to a server or other device for comparison to previously-stored information. The scanner is then automatically associated with the shopper to whom the fingerprint corresponds. In another embodiment, scanned loyalty card information is preferably transmitted (optionally, along with a scanned barcode), such that the scanner is then automatically associated with the shopper to whom the loyalty card corresponds. Disassociating the scanner from a shopper is preferably triggered using a sensor (such as a light) that forms part of the scanner device, whereby the sensor is activated when the shopper releases the scanner device. A timer may be used to filter out accidental activation of the sensor. The on-demand point-of-sale scanner access employs a procedure that merely associates the biometric data of the user with a scan gun that is used for scanning an item to be purchased. Since the biometric data of the user is previously stored in the main computer, the purchase of the scanned item is added to the list of purchased items. The scanning operation is not carried out by the employee of a retail establishment, and the details of the product are not presented to the customer. Merely scanning an object adds the scanned object to the purchased list, and the customer has no means to delete the item from the purchased list. The scanner does not have a tablet attached thereto.

U.S. Pat. No. 8,235,294 to Miller et al. discloses an accuracy-enhanced scanner. This accuracy-enhanced scanner provides, in response to a first user input, illumination of potential scan targets and, in response to a second user input, scans a selected scan target. The user employs the illumination to aim the scanner at the selected scan target in between providing the first and the second user inputs. The scanner has switches to communicate the user inputs, to specify an operating mode for the scanner, and/or to communicate information codes to a computing device. The scanner has one or more scan engines (such as a barcode reader or an RFID tag reader), and optionally communicates wirelessly with the computing device. A scanning system including the scanner optionally provides feedback to the user based on feedback from a host processor. The scanner is any of a Multi-Mode Ring Scanner (MMRS), a cordless hand scanner, or a Personal Digital Assistant (PDA) with an add-on scanner. Scanners of various types are mounted on a ring powered by a wrist worn device. The device does not have a tablet attached to an input device. Even though the ring is said to have a magnetic card reader, there is no indication where this operation can be carried out.

U.S. Pat. Nos. 8,250,187, 8,255,499 and U.S. Pat. No. 8,255,500 to Cacheria III, et al. disclose a distributed transaction system. This system is operative to interface predetermined services to a user at a fixed location, and includes a processing platform running an operating system. Also included are pluralities of physical system resource interfaces for interfacing with available physical system resources. The physical system resources allow a user to gain access to the predetermined desired services. The system further includes a data store for storing configuration information that enables the operating system to interface with the available physical system resources through the physical system resource interface associated therewith. A communication resource for interfacing with the operating system allows communication of the operating system with a central office for downloading configuration information to selectively enable ones of the available physical system resources to interface with the operating system through associated ones of the physical system resource interfaces in accordance with the configuration information and the predetermined service selected by a user. A plurality of configurations is stored in the data store, and each is associated with a predetermined service and one or more of the available physical system resources. Each physical system resource interface is uniquely associated with a defined one of the physical system resources. This method has a number of terminals or service providers interacting with a central processor, which can communicate with banks and other financial institutions authorizing credit purchases. While verification of customer at terminal 110 is indicated, '110' is not an employee present on the retail store environment. Also, the terminals are not associated with a barcode scanner and/or mobile device having barcode scanning and magnetic payment card swiping features. There is no employee in the retail location that has a barcode scanner scanning a particular object of interest to a customer, to provide full details of the product, its price and available promotions.

U.S. Patent Application Publication No. 20120209749 to Hammad et al. discloses a snap mobile payment apparatus, methods and systems. This snap mobile payment (SNAP) system transforms real-time-generated merchant-product Quick Response (QR) codes via SNAP components into virtual wallet card-based transaction purchase notifications. In one embodiment, the SNAP obtains a snapshot of a QR code presented on a display screen of a point-of-sale device from a mobile device. The SNAP decodes the QR code to obtain product information included in a checkout request of the user, and merchant information for processing a user purchase transaction with a merchant providing the QR code. The SNAP accesses a user virtual wallet to obtain user account information to process the user purchase transaction with the merchant. Using the product information, merchant information and user account information, the SNAP generates a card authorization request, and which the SNAP provides to a payment network for transaction processing. Also, the SNAP obtains a purchase receipt confirming processing of the user purchase transaction. The snap mobile payment apparatus, methods and systems require the user to present the QR code and the virtual wallet to make a purchase. This requires the customer to take a picture of the QR code and show it at the sales kiosk register or bring the product to the sales kiosk, a cumbersome operation. There is no employee in the retail location that has a barcode scanner with a tablet adapted for scanning a particular object of interest to a customer, to provide full details of the product, its price and available promotions.

Non-Patent Literature "Infinite Peripherals IPC_Infinea_Tab_Spec.pdf" at http://ipclineapro.com/infinea-tab-ipad/ discloses a tablet that is attached to a swivel head and has an application for barcode scanning, magnetic card reading. The 'IPC_Infinea_Tab is clearly a stand for attaching a tablet. The previous page states that the Infinea tab has active scanning, active barcode reader, and active search magnetic card reader. It has two buttons for starting the scan operation. It is not indicated to receive a command from a barcode scanner to scan a barcode or read a magnetic card. Further, the Application in the tablet does not communicate with a central corporate ERP system within the retail location to determine detailed description of a scanned product; determine its inventory, price and promotions. Furthermore, it does not also allow the POS store systems server to process a payment card transaction for the purchase of a product.

U.S. Pat. No. 8,235,289 and U.S. Patent App. Pub. No. 20120298740 to Hsu et al. disclose point of sale terminals generally including a housing including at least first and second housing portions which are arranged for relative axial movement from a closed position to an open position, the first housing portion including at least a communications interface adapted for operative communications engagement with a mobile communicator and a first housing portion socket adapted for partially surrounding the mobile communicator, the second housing portion including a second housing portion socket adapted for partially surrounding the mobile communicator and the first and second housing portions being configured such that when they are arranged in the closed position the first housing portion socket and the second housing portion socket together hug the mobile communicator and prevent unwanted disengagement of the mobile communicator therefrom. The point of sale terminals do not provide inventory management in conjunction with point of sale transaction capability throughout a retailer establishment. Furthermore, the terminals are specifically constructed to receive and house a phone device such as that commonly sold under the trade name iPhone. Consequently, the terminals are limited in structure and function to use with narrowly tailored constructs. What is more, the terminals provide for a magnetic card swiping device integrated within the terminal body itself, and as a result the phone device must be mounted within the particular terminal to carry out the point of sale transaction.

U.S. Pat. No. 5,324,922 to Roberts discloses an apparatus for managing a transaction using a transaction terminal having a manual code reading device, such as a barcode reader, for reading a data code printed on a visual medium. A transaction program forming part of the system includes at least one page of a visual medium having a first and second sets of data codes printed thereon. The first set of data codes in printed in a prearranged sequence and comprises a predetermined sequence of program commands for carrying out all of the steps of a prearranged transaction, including a subset of program commands associated with a corresponding subset of data entry steps. The second set of data codes is printed on the same or another page of said visual medium. Each of the data codes in the second set comprises a prearranged item of transaction data for use in said data entry steps. The transaction terminal includes a computer means interfaced to the manual code reading means. This computer means includes a program storage device and a data storage device. The apparatus relates to managing transactions of the type involving home shopping, bill paying and the like, and does not relate in structure or function to mobile point of sale systems for use in retail establishments. As such, the point of sale terminal does not provide a mobile tablet device capable of being mounted on a scanner device for integration and communication for sales transactions and inventory management.

U.S. Patent Application Publication No. 20130030933 to Talach et al. discloses a payment facilitating system for use with a mobile communicator and a point of sale (POS) terminal, the system including a Near Field Communication (NFC) financial transaction communication link between the mobile communicator and the POS terminal, the NFC financial transaction communication link being operative to communicate NFC data for use in a financial transaction, a non-NFC financial transaction communication link between the mobile communicator and the POS terminal, the non-NFC financial transaction communication link being operative to communicate non-NFC data for use in the financial transaction, and a transaction effector operative to complete the financial transaction using both the NFC data communicated directly between the mobile communicator and the POS terminal over the NFC financial transaction communication link and the non-NFC data communicated directly between the mobile communicator and the POS terminal over the non-NFC financial transaction communication link. The payment facilitating system relates to NCF data transmission for payment at a POS terminal via NCF data programmed with a user's cell phone or smart phone device to provide payment at the checkout via the cell phone. The system does not relate in structure or function to mobile point of sale systems for use in retail establishments.

U.S. Patent Application Publication No. 20120296741 to Dykes discloses a payment system including a transaction server, a virtual wallet server (VWS), at least one point of sale device including a secure element and being operative to provide secure data communication of a purchaser wallet personal identification number (WPIN), but not purchaser payment particulars, to at least the VWS and at least one mobile communicator communicating a mobile communicator presence indicator (MCPI) but neither the purchaser WPIN nor the purchaser payment particulars to the at least one point of sale device. The payment system relates utilizing a mobile device at the register counter of a retail establishment for data transmission of payment with the mobile device. The system does not relate in structure or function to mobile point of sale systems for use in retail establishments.

U.S. Patent Application Publication No. 20120284131 to Soffer et al. discloses a mobile commerce system including a multiplicity of Mobile Device-Point of Sale Communication (MPC)-equipped mobile devices, a plurality of MPC-enabled Point-of-Sale (POS) devices, at least one POS configuration server for configuring the plurality of MPC-enabled POS devices, at least one MPC-equipped mobile device configuration server for configuring the plurality of MPC-equipped mobile devices and at least one mobile marketing platform server operative to introduce Transaction Value Certificate (TVC)-related functions and to communicate both with the at least one POS configuration server and the at least one MPC-equipped mobile device configuration server to coordinate operation thereof so that the MPC-enabled POS devices will be "tap-ready" for carrying out the TVC-related functions. The mobile commerce system is structured having a multiplicity of Mobile Device-Point of Sale Communication (MPC) wallet-equipped mobile devices, typically smart phones such as mobile communicators operating on an ANDROID® (Google), iOS® (Apple), BLACKBERRY® or WINDOWS MOBILE® (Microsoft) operating system, and a plurality of MPC-enabled point of sale (POS) devices, for example, an electronic cash register (ECR), connected to a Near Field Communication (NFC)-enabled payment terminal. The mobile commerce system does not provide a system having a barscanner device integrated and in communication with a mobile tablet with payment card receiving capability. The system does not relate in structure or function to mobile point of sale systems for use in retail establishments.

U.S. Patent Application Publication No. 20120072350 to Goldthwaite et al. discloses a system processes a request by a customer to pay a transaction amount, using the customer's account, for a transaction between the customer and a merchant, to provide a payment to an account of the merchant. The transaction incorporates use of a mobile wireless device operated by the customer to provide identification information of the customer's account to an authentication server. A payment server coupled to the authentication server and the merchant passes merchant communications to the authentication server. The authentication server receives the transaction amount from the merchant and receives customer account information from the customer's wireless mobile device, and processes the transaction and account information and, if authenticated, routes the payment transaction to the payment server for payment to the merchant's account. The system relates utilizing a mobile device at the register counter of a retail establishment for data transmission of payment with the mobile device. The system does not relate in structure or function to mobile point of sale systems for use in retail establishments.

Non-patent literature entitled "PAYware Mobile Enterprise" found at http://www.verifone.com/products/hardware/mobile/payware-mobile-enterprise discloses a mobile payment solution that transforms smartphones and tablets into secure transaction portals. The literature teaches swiping, inserting or tapping a card, to execute payments. In addition, advanced features such as a 2D barcode imager, integrated PIN pad and customizable app integration are provided for merchants who want their store associates to get up from behind the cash register and interact with consumers anywhere in the store. The mobile payment solution does not provide use outside of the store; the devices disclosed fail to provide the ability for use throughout a retailer's establishment, including other locations and warehouses of the retailer.

Despite heretofore disclosed and utilized systems and methods, managing inventory throughout retailer establishments, nationally and internationally, has proven unreliable and difficult. POS capabilities remain separate from inventory management throughout retailer establishments and as a result both retailers and customers are tied to the physical location of the checkout work station, resulting in frustration and loss of sales.

Based on the foregoing, there exists a need for a mobile scanner system with an integrated mobile tablet device utilizing a system and method that communicates real-time daily inventory management such as physical inventory, cycle counting, inventory receiving, store to store transfers, return to vendor, and product re-ticketing, while at the same time providing the ability for POS customer sales transactions throughout the store and beyond its walls. Further, there is a need in the art for a system and method that is appointed to be utilized with several USB devices such as a mobile portable barcode scanner and magnetic stripe reader (MSR) input devices that can be carried by retail employees in a retail location to provide daily inventory management applications for a full combination of tasks, including physical inventory, cycle counting, inventory receiving, store to store transfers, return to vendor, product re-ticketing, as well as POS customer sales applications throughout the store and beyond its walls. Additionally, there is a need in the art for a system and method that can scan the barcode of merchandise of interest by the customer, provide complete details of the product along with its selling price and taxes, as well as any physical and electronic coupons, promotions, and customer loyalty data and rewards available. Through use of such a novel system, a customer may decide to purchase the merchandise just scanned or look at additional items, and when a purchase decision is made by the customer, an employee can readily tender the purchase, providing a courteous friendly sales environment wherein every employee has complete access to all the relevant information on any product of interest and their customer loyalty data and rewards available.

SUMMARY OF THE INVENTION

The present invention provides a free standing Application for a mobile scanner system with an integrated mobile tablet device, that is capable of linking the user to the central corporate Enterprise Resource Planning (ERP), which provides a system and method, and devices utilizing same, that executes daily store level inventory management objectives and POS customer sales transactions. Store level inventory management functions include such tasks as physical inventory, cycle counting, inventory receiving, store to store transfers, return to vendor, re-product ticketing, and to operatively identify a product by its barcode, establish price, taxes, promotions, electronic and physical coupons and customer loyalty data and rewards available and tender the sale of product to a customer through a mobile POS application, regardless of the location of the inventory. From within the POS transaction, if the inventory is unavailable in the store, the sold inventory can be transferred from the warehouse, another store or special ordered and made available at any store for customer pickup or shipped to a customer location. In the case the inventory is unavailable, once the transaction is completed on the mobile tablet device, the item and quantity of the selected fulfillment location is allocated within the corporate ERP system and visible chain-wide.

The store mobile cloud application system is constructed having retail mobile applications associated with software that includes the subject corporate ERP system and POS store systems server associated with a user of the mobile scanner system and retailer's data. The retail store mobile cloud application system is connected and operated through encrypted Wi-Fi or wireless cellular connectivity back to the POS store systems server and the central corporate ERP system relating to the retailer's store level inventory management and mobile point of purchase throughout the store and beyond its walls. The mobile applications are operative to establish a Wi-Fi or wireless cellular connection between the mobile tablet device and the POS store systems server and corporate ERP system.

When the user/employee selects an application icon on the mobile tablet device, several applications are available to either manage real-time daily store level inventory management directly accessing the corporate ERP system and visible chain-wide or process POS sales transactions for customer purchases providing the selling price and taxes, as well as any physical and electronic coupons, promotions, customer loyalty data and rewards available and product support via video conferencing. Within the POS application, sell merchandise unavailable within the operating store from any other store or warehouse within the chain, once the transaction is completed on the mobile scanner system, the sold merchandise is allocated and updated within the corporate ERP system and systemically visible chain-wide.

The application icons are displayed on the mobile tablet device and include software readable from the corporate ERP system, as well as the POS store systems server and include the subject specially programmed mobile applications. The mobile scanner system has functionality to communicate wirelessly with both the corporate ERP system and the local store's POS store systems server, which is primarily connected via Wi-Fi communication and is secured using standard Wi-Fi Protected Access (WPA) and Wi-Fi Protected Access II (WPA2) wireless encryption methods; alternatively, a secondary means of communication is available through a wireless cellular module intergraded into the tablet and accessed via a data plan through a standard cellular carrier and secured using the same protocols as Wi-Fi. The mobile applications have functionality to order an electrically erasable programmable read only memory (EEPROM) present within the Main PCB to conduct various functions, and this directive is sent through the specialized universal serial bus wiring harness. The communication between the USB input devices and mobile tablet device occurs back and forth depending on a specific application functional operation.

The EEPROM of the Main PCB carries a programmed instruction set and works in conjunction with the mobile applications of the mobile tablet device. For example if a barcode scanner gun trigger of the mobile scanner system is pressed by the retail store employee according to the interest of a customer, this event is detected by the EEPROM of the Main PCB and is communicated to the mobile application within the mobile tablet device. The EEPROM interprets and parses the barcode read and formats it in a manner that is readily recognized by the mobile application. The mobile application communicates with the POS store systems server to obtain the details of the product scanned, its selling price, any coupons, promotions, customer loyalty data and rewards available and the available inventory of the product chain-wide, including the warehouse. The mobile tablet device displays the entire data on the screen and the retail store employee may discuss these details to the customer allowing the customer to make a purchase decision. Optionally, the POS store systems server may suggest other similar products with enhanced functionality, reduced selling price and the like. Accordingly, the customer may view similar products and review product details to come to a purchase decision. Optionally, if the item is not available in the current store's inventory, the employee may suggest the item be shipped from the warehouse or another store within the chain.

When the customer reaches a purchase decision of a product displayed on the mobile tablet device screen, the employee of the store selects an application icon to invoke the mobile POS application. If shipping is required, the customer provides the customer name, address, contact telephone number, and email address if they are not already in the customer loyalty database. The customer provides a payment card to the retail store employee which is swiped in the MSR slot of the USB MSR input device. The MSR track data is encrypted using industry standard Triple DES with DUKPT by the MSR reader before the data is transferred to the POS application. The employee allows the customer to sign their name on the mobile tablet device using an integrated signature capture feature of the mobile POS application to validate the sale and then the information received from the customer is securely transferred by wireless communication to the POS store systems server, which processes the customer payment card by contacting a bank card processor via a PCI certified network connection. Upon receiving credit authorization of the purchase, the mobile tablet device of the mobile scanner system displays information that the purchase is complete and the employee bags the sold merchandise and presents it to the customer. The POS store systems server updates the corporate ERP system, adjusting the inventory on-hand of the merchandise sold making it visible chain-wide. The POS store systems server sends an email of the receipt to the customer's email address, which may be readily viewed in a smart phone carried by the customer. If desired, a hard copy of the receipt for the purchase is printed on a local printer within the retail establishment via the store's local network.

With this system, the customer does not have to bring the merchandise to a central check out location. The purchase operation is conducted anywhere throughout the store by a retail store employee carrying a mobile scanner system, and has up to date information concerning product inventory of any item in their retail location or chain-wide, along with current details, electronic and physical coupons, promotions and customer loyalty data and rewards.

The following paragraph details the elements, which collectively enable operation of the system as detailed hereinabove. The mobile tablet device of the mobile scanner system preferably comprises a custom-developed, industry hardened mobile tablet device utilizing a base mount universal receiver with rotational coupling to connect to one of four base housing concepts and a specialized universal serial bus wiring harness to connect to the USB input devices, such as a barcode scanner and MSR. Various operating systems, such as those associated with the trade name Android (Google), iOS (Apple), and Windows (Microsoft) are contemplated. The mobile tablet device has custom programmed mobile applications on the Android platform. The mobile tablet device (upper receiver) is connected to each base housing concept through a base mount universal receiver with rotatable coupling, integrated into each of the four base housing concepts, including a mobile scanner gun system, a wearable mobile scanner system, a handheld scanner system, and a fixed docked POS workstation, each with a USB scanner input device integrated into the base, except for the handheld housing, which has the scanner input device integrated into the mobile tablet device (upper receiver) directly below the USB MSR input device. The rotational coupling permits changing the orientation of the mobile tablet device in the portrait mode or in the landscape mode of the mobile tablet device display screen. The upper receiver has an industry standard USB MSR input device integrated along the short edge of the mobile tablet device for easy access by the user regardless of which base housing is selected for use.

A key feature of the invention is an electrically erasable programmable read only memory (EEPROM) that has a previously programmed instruction set present within the Main PCB. The EEPROM of the Main PCB is connected to the mobile tablet device and can process the command issued by the mobile application to command either the barcode scanner or the MSR to acquire pertinent data. The EEPROM of the Main PCB organizes the data in proper format and delivers it to the mobile tablet device through the specialized universal serial bus wiring harness. Due to the use of the EEPROM, which can process barcode and payment card data, the attached mobile tablet device can perform secure distributed sales within a retail establishment. Each of the employees of the retail establishment knows instantaneously the inventory of any particular item chain-wide, the barcode of an item that is scanned along with its price as well as discounts, electronic and physical coupons, promotions, and customer loyalty data and rewards. Thus a customer may look at several product items and ask the employee of the retail organization to know the product details and customer loyalty data and rewards. This provides a pleasant, informative interaction between the customer and the employee of the retail organization, establishing one-on-one, face-to-face relationship, which is appreciated by the customer and results in an improved sales environment.

BRIEF DESCRIPTION OF THE DRAWING

The invention will be more fully understood and further advantages will become apparent when reference is had to the following detailed description of the preferred embodiments of the invention and the accompanying drawing, in which:

FIG. 1 illustrates a flow chart schematic of the store mobile cloud application system of the subject invention;

FIG. 2 illustrates a network schematic of the store mobile cloud application system of the subject invention;

FIG. 3 illustrates a flow chart schematic of steps carried out by the subject store mobile cloud application system;

FIG. 10 is a schematic diagram illustrating an embodiment of the circuit of the Main PCB in communication with the mobile tablet device and supporting initiation of the subject executable mobile applications;

FIG. 14 is a screen shot illustrating a representation of a main POS application screen;

FIG. 17 is a screen shot illustrating a representation of an electronic email receipt screen.

DETAILED DESCRIPTION OF THE INVENTION

Figure 4A:
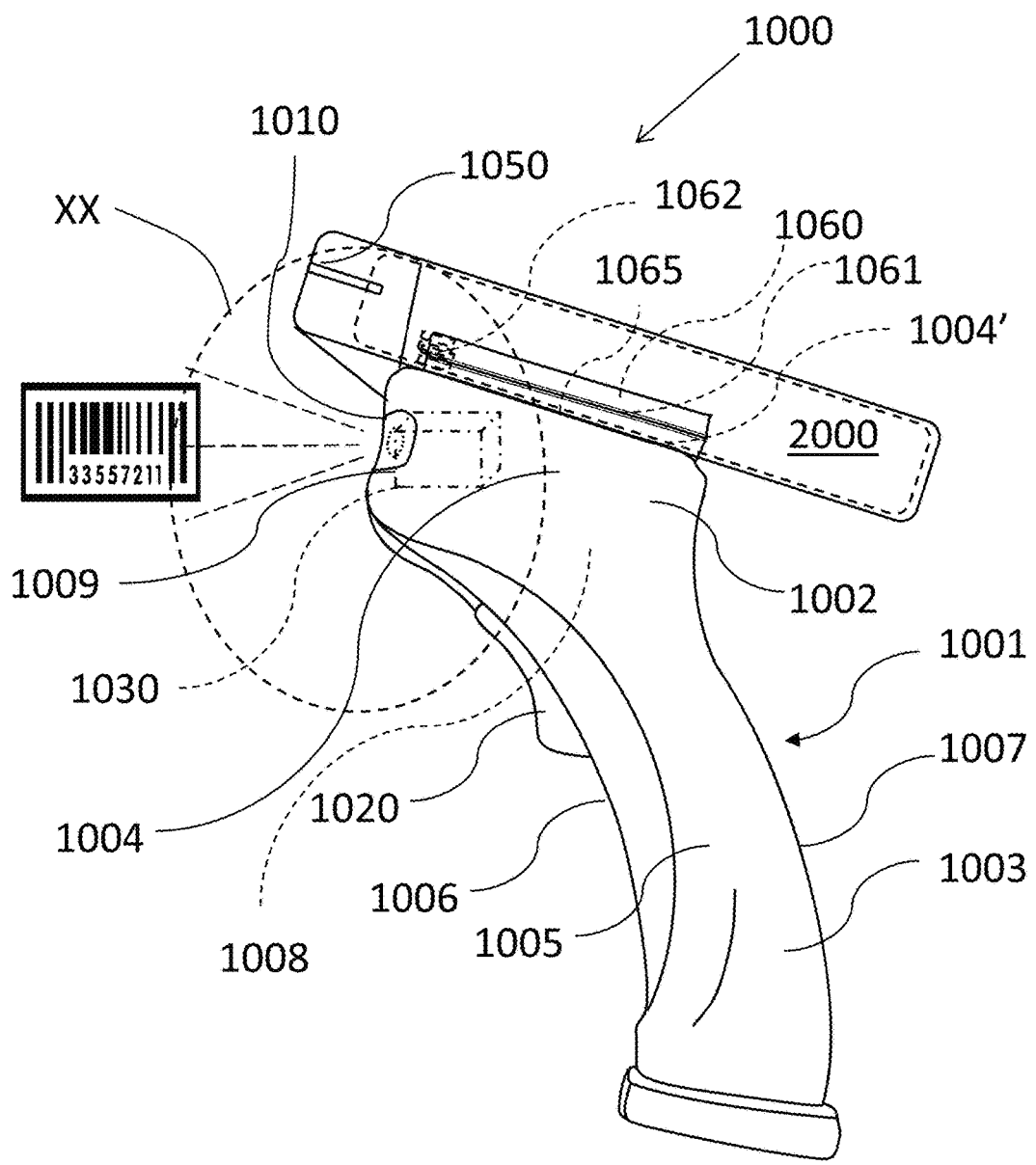
FIG. 4a illustrates a mobile scanner gun system docked through a base mount universal receiver with rotational coupling to a mobile tablet device operating in concert under the store mobile cloud application's operation system.

This invention relates to a store mobile cloud application system for store level real-time inventory management and a fully functioning POS system for customer check-out of merchandise in a retail sales environment. The system comprises a mobile tablet device (upper receiver) having a display with the store mobile cloud application system software downloaded, which has an industry standard USB MSR input device integrated along the short edge of the mobile tablet device for easy access by the user regardless of which base housing is selected for use. Within each base housing concept, there is a USB scanner input device in communication with the mobile tablet device through the specialized universal serial bus wiring harness. The upper receiver is connected to the each base housing concept through the base mount universal receiver with rotational coupling. The mobile tablet device rotation allows for viewing in both a portrait mode and landscape mode.

The store mobile cloud application system is constructed having a number of mobile applications associated with software that includes the subject ERP system and the POS store systems server associated with a user of the mobile tablet device and the retailer's data. The retail mobile applications are displayed through the store's Wi-Fi or wireless cellular connectivity displaying at least one message related to the retailer's inventory, pricing, product location and available stock. The store mobile cloud application system is operative to establish a Wi-Fi or wireless cellular connection between the mobile tablet device and the ERP system and the POS store systems server.

When the user/employee selects an application icon on the store mobile cloud application system, several applications are available to either manage real-time store level inventory management directly accessing the corporate ERP system, which is available chain-wide or process POS sales transactions for customer purchases, running on the POS store systems server, including ancillary applications such as StoreMS Gift Card™ and StoreMS Loyalty Rewards™ and product support via video teleconferencing; and, within the POS application, sell inventory unavailable within the operating store from any other store or warehouse within the chain and allocate those inventory positions while transacting within the POS application, which are visible chain-wide through the ERP system.

The application icons are displayed on the store mobile cloud application system and include software readable from the corporate ERP system, as well as the POS store systems server and include the subject specially programmed mobile applications. The store mobile cloud application system has functionality to communicate wirelessly with both the corporate ERP system and the local store's POS store systems server, which is primarily connected via Wi-Fi communication and is secured using standard Wi-Fi Protected Access (WPA) and Wi-Fi Protected Access II (WPA2) wireless encryption methods; alternatively, a secondary means of communication is available through a wireless cellular module intergraded into the mobile tablet device and accessed via a data plan through a standard cellular carrier. The mobile applications have functionality to order an EEPROM present within the Main PCB to conduct various functions, and this directive is sent through the specialized universal serial bus wiring harness. The communication between the USB input devices, such as the barcode scanner and MSR, and the mobile tablet device occurs back and forth depending on the application function in operation.

The system and method of the present invention provides technology that empowers sales associates to service their customers without consideration to the physical location of the product. Through use of the subject system and methods, goods can be purchased anywhere, anytime and delivered wherever and whenever the consumer wants it. Under current systems and methods, the consumer must travel to the location of the good (or order the good on-line through their personal device and wait for delivery or in store pick-up). This adds an inconvenient step—that is rather than allowing the sales associate to simply handle the purchase via a mobile POS device and have the item delivered where the customer wants, the customer must drive to the other location or place his/her own order through his/her own means. Not only is this inconvenient, but such inconvenience often results in the loss of the sale altogether, as the customer may decide to forego the purchase, or simply move on to the competitor's store if it is nearby and convenient to do so.

None of the heretofore systems and methods provide the ability for a retailer to utilize software and hardware that runs the entire store, ranging from real-time store level inventory management, to POS customer sales transactions. The system, method and devices herein provide this unique advantageous feature. The subject system and method, and devices implementing same, provide the following advantages: 1) increased store productivity, 2) reduced technology cost and footprint, and 3) improved customer satisfaction, all of which in turn lead to ensured return on investment (ROI).

ERP systems integrate internal and external management information throughout an organization, embracing finance/accounting, manufacturing, sales and service, customer relationship management, etc. ERP systems automate this activity with an integrated software application. The purpose of ERP is to facilitate the flow of information between all business functions inside the boundaries of the organization and manage the connections to outside stakeholders. ERP systems can run on a variety of computer hardware and network configurations, typically employing a database as a repository for information. Examples of vendors who build industry leading ERP systems include: JDA Software Group, Oracle, SAP, Epicore, etc. However, present systems do not provide the ability for a store employee at a physical store location to have direct mobile access to real-time inventory management and POS capability.

The subject system and methods provides real-time daily store level inventory management and POS customer check-out to retail establishments that complement current merchandising systems generally utilized by chain retailers. Real-time mobile functionality is provided by the subject system and methods, preferably built for Merchandise Management System (MMS) users from store level POS store operations to central corporate office MMS in their current MMS iSeries environment. Through use of the subject system MMS iSeries environment, businesses can build their own cloud to provide mobile customer check-out/order fulfillment and real-time inventory management in the store through the store mobile cloud application system.

Uniquely, the subject system and method uniquely provides the ability to use a mobile scanner system in a store to yield the following benefits: 1) it allows sales associates to service customers in new ways that deepen customer loyalty and increase wallet share; 2) it provides inventory management for increased accuracy, efficiency, and accountability while providing real-time access to corporate inventory data; 3) it eliminates workflow in the back office and keeps the retailer's sales associates on the sales floor; and 4) it results in higher customer satisfaction. Implementation of the subject system and methods, and devices thereon implemented provides strong store level inventory management, and leveraging current technology infrastructure ensures ROI.

Advantageously, the subject system, method and devices of the present invention allow a sales associate using a mobile scanner system anywhere in the store and beyond its walls to carry out inventory management tasks such as: a) Daily Cycle Counting & Physical Inventory, b) Receiving & Returns, c) Store Transfers, d) Item Checking, e) Re-Ticketing, etc. Such tasks are performed real time within the ERP system and are all visible chain-wide. Further, the sales associate can run POS on the sales floor or physically away from the store, with all the capability previously contained at the POS terminal. Through use of the subject system and method, a sales associate can perform the following from a mobile POS device: i) sell "out of stock" product available in the warehouse, another store or from a vendor; ii) create a purchase order (PO) or transfer within MMS and track that item transfer on the web; iii) sell products from their e-commerce site; iv) combat "Showrooming" by providing customers real-time competitive product and pricing information, allowing staff to match prices and satisfy their customer's demands by exceeding expectations at the point of purchase.

Mobile POS represents the technology future of retail stores. For decades retail stores have been designed around fixed cash-wrap POS stations/register stations. New studies indicate that cash-wrap POS stations/register stations are becoming less relevant in future retail markets. Approximately one fifth (21.4%) of retailers are planning on removing or decreasing use of traditional fixed-station POS/register stations per store. In many retail verticals, mobile POS will eventually replace these systems. As mobile tablet devices mature and harden the need for POS register stations, terminals and smart RF scan guns with cryptic processes will continue to dwindle.

However, RF data terminals fall short; although many are durable and retail hardened, and work well for inventory, they are ineffective on sales floor for POS customer check-out due to lack of functionality and usability. Moreover, conventional RF data terminals are very expensive and typically locked into outdated technology. Although consumer tablet and smartphone devices appear to have some potential to fill this gap, these devices lack durability, hardware integration, and retail specific software and functionality.

The system and method of the present invention provides implementation within a mobile scanner gun system that performs all the necessary real-time store level inventory management functions and utilize the Internet to provide competitive analysis, thus determining product pricing for the customer and transacting the sale accordingly. The mobile scanner gun system is totally mobile throughout the store and beyond its walls and does not compromise workflow or require extensive training to use. The system, method, and devices of the present invention 1) match the exceptional "work flow" performance of legacy radio frequency (RF) data terminal for inventory management, 2) match the transaction speed of the POS terminal found in a high volume retail store, 3) are Payment Card Industry (PCI) compliant, since security is a necessary prerequisite in today's retail environment, and 4) are durable, since the store environment will challenge practically any piece of hardware.

An advantageous feature of the mobile scanner system and mobile tablet device of the invention is the simplicity of their design, which ensures that the final product is both richly functional and cost effective. The mobile tablet device (upper receiver) is removable from the mobile scanner system, is readily docked in other types of base housing platforms, and is additionally capable of being docked in a fixed POS workstation. By using standard industry components such as industry standard MSR heads and barcode scanner components in conjunction with a preferably customized mobile tablet device, the mobile scanner system with mobile tablet device integration capability therein will provide all the standard features of a typical consumer grade tablet, coupled with retail industry hardened components integrated into an industry hardened frame—built for industrial use—with an "easy to use" scan gun model, wearable model, hand held model and fixed POS workstation model and with the subject system and method readable therein. The functional specification of the mobile tablet device is a mini tablet that preferably measures about 2 inches to 10.5 inches diagonally, preferably 4 inches to 7 inches, and most preferably 5 inches to about 5.5 inches diagonally. The handle of the mobile scanner system is preferably coated with rubber for comfort and/or is received within a comfort grip rubber covering, and trigger is ergonomically designed to be more like a pistol. Rotation from landscape mode to portrait mode of the mobile tablet device is achieved with compression tubes—as compression springs roll in and out via a dial—rotates smoothly but stays in place when it gets there. The mobile tablet device slides on and off from the mobile scanner system through communication of a button on one side of the mobile tablet device, sliding on and off via a groove slide. The Main PCB of the mobile scanner system is powered by a rechargeable lithium ion battery, as well as a battery backup that extends battery life for a period of time that is necessary to assure uninterrupted operation on the sales floor.

An external DC jack is used for charging the lithium ion battery and the mobile tablet device itself. Portability of the mobile tablet device upper receiver for the system and method mobile tablet device implementation provides four different types of deployment. The mobile tablet device upper receiver is consistent for the mobile scanner system with integration mobile tablet device capability to a scan gun model, wearable model, hand held model and fixed POS workstation docked model. Portability makes the system's mobile tablet device upper receiver even more valuable.

Generally stated, the present invention comprises a system and method for use with a mobile scanner system associated with an integration capable mobile tablet device. This system, method, mobile scanner system and integration capable mobile tablet device is used by an employee on a sales floor of a retail establishment for both real-time daily store level inventory management purposes for such tasks as physical inventory, cycle counting, inventory receiving, store to store transfers, return to vendor, product re-ticketing and to operatively identify a product by its barcode, establish price, promotions, electronic and physical coupons and customer loyalty data and rewards available and process sale of merchandise to a customer regardless of the location of the inventory. The sold inventory can be transferred to any store for customer pickup or shipped to a customer location from the mobile scanner system. Once the transaction is completed on the mobile scanner system, the sold item is allocated and systemically visible within the ERP system chain-wide. With this system, the customer does not have to bring the merchandise to a central check out location. In conventional systems, the checkout procedure is typically carried out without the customer having adequate knowledge of the product, or comparing its features, price or the like with other competing products. Through use of the system and method implemented for use with a mobile scanner system and integration capable mobile tablet device, an employee of a retailer can sell merchandise from any store—not only from within the particular store's inventory, but within any store or any warehouse chain wide. The mobile scanner system reads the barcode of a particular item that is available for purchase, and retrieves from the POS store systems server, using wireless communication, details concerning the product. Such details may include current pricing, together with discounts available, so that the retail salesperson on the floor can communicate the pricing structure to a potential customer at the point-of-sale. If the customer decides to purchase the item, the name of the customer as well as the customer's e-mail address is recorded if they are not already in the customer loyalty database, and the payment card of the customer is swiped through the MSR. The appropriate encrypted payment card information is wirelessly transmitted via an encrypted communication to the POS store systems server within the store and onto a certified bank card authorization processor, whereby the encrypted authorization is returned to POS store systems server. Unless credit is denied, the purchase is authorized and the customer is given the purchased product. The receipt for this purchase can be printed on the store network or sent by e-mail to the customer. The POS store systems server transmits the transaction details of the sale to the corporate ERP system of the merchandise sold, updating those inventory positions, which are systemically visible chain-wide.

The mobile tablet device of the mobile scanner system preferably comprises a custom-developed, industry hardened mobile tablet device utilizing a specialized universal serial bus wiring harness to communicate with USB input devices such as a barcode scanner and MSR. Various operating systems, such as those associated with the trade name Android, iOS, and Windows are contemplated.

The mobile tablet device is connected through a base mount universal receiver with rotational coupling integrated into the unique base housings, which is placed directly below the mobile tablet device in the scan gun model, integrated into the upper receiver in the hand held model, integrated into the back of the forehand in the wearable model, and fixed within the stand frame of the POS workstation model. The rotational coupling permits changing the orientation of the mobile tablet device in the portrait mode or landscape mode of the mobile tablet device display screen. There are a minimum of two standard input devices with others contemplated: A barcode scanner and an MSR.

The MSR is positioned on the short edge of the mobile tablet device directly above the scanner in the scan gun model, which is forward facing on the base of the gun in front of the trigger. Both the scanner and the MSR are connected to the mobile tablet device using a specialized universal serial bus wiring harness through the USB port. The mobile tablet device has custom programmed applications in the Android, IOS and Windows platforms.

FIG. 1 illustrates a flow chart schematic of the store mobile cloud application system of the subject invention, shown generally at 10. Upon initiation/start of the mobile tablet device and selection of an application icon on the mobile tablet device's display, the appropriate USB connected input device (scanner or MSR) is triggered when prompted by the user/employee for whom the mobile scanner system is configured for at 10'. Upon activation, the appropriate USB input device executes communication at its given location with the appropriate mobile application through its respective device driver, indicated generally at 11 and 12, respectively. The mobile application then initiates communication with either the POS store system server or the corporate ERP system using an encrypted message format (WPA or WPA2), shown at 13 and 14, respectively.

When the user/employee selects an application icon on the store mobile cloud application system, several applications are available to either manage store inventory real time by directly accessing the ERP system, which is available chain-wide or process POS transactions for customer purchases, running on the POS store systems server, including ancillary applications such as StoreMS Gift Card and StoreMS Loyalty Rewards, and product support via video teleconferencing; and, within the POS application, sell inventory unavailable within the store from any other store or warehouse within the chain and allocate those inventory positions within the POS transaction, which are visible chain-wide through the ERP system.

The application icons are displayed on the store mobile cloud application system and include software readable from the corporate ERP system, as well as the POS store systems server and include the subject specially programmed mobile applications. The store mobile cloud application system has functionality to communicate wirelessly with both the corporate ERP system and the local store's POS store systems server, which is primarily connected via Wi-Fi communication and is secured using standard Wi-Fi Protected Access (WPA) and Wi-Fi Protected Access II (WPA2) wireless encryption methods; alternatively, a secondary means of communication is available through a wireless cellular module intergraded into the mobile tablet device and accessed via a data plan through a standard cellular carrier. The mobile tablet device initiates an EEPROM present within the Main PCB to conduct various functions at 15. The mobile applications have functionality to order an EEPROM present within the Main PCB to conduct various functions, and this directive is sent through the specialized universal serial bus wiring harness. The communication between the USB input devices, such as the barcode scanner and MSR, and the mobile tablet device occurs back and forth depending on the application function in use. At 16 the executed mobile applications and server software thereof provides for the ability to carry out real-time daily store level inventory management tasks or POS customer transactions, with instantaneous communication to the POS store systems server and ERP system to adjust inventory allocation visible across the retail chain, create purchase orders (PO) and transfer documents, sell product to customers, enter customer information, transact payment, entry of shipping information, and execution of shipping operation throughout any retail location of the retailer.

FIG. 2 illustrates a network schematic of the store mobile cloud application system of the subject invention, shown generally at 20. A plurality of user mobile tablet devices 21 are supported by the system, each including the subject mobile applications. Preferably the mobile tablet device is a custom built industry hardened mobile tablet device and users include employees or agents of the retail establishment. The mobile tablet device includes Wi-Fi and wireless cellular connectivity means, software readable medium, and location based means for determining location of a given retail store with other local stores, regional stores, national stores, and international store locations for providing distance information to a customer for pick-up and/or shipping information purposes for executing a POS transaction. Upon execution, the appropriate application communicates with either the POS store systems server 25 or the ERP system 26 of the retailer's enterprise including substantially all local, regional, national, and international locations.

FIG. 3 illustrates a flow chart schematic of steps carried out by the subject store mobile cloud application system, shown generally at 50. In the first step of execution of the software through initiation of the icon and execution of the appropriate application, a mobile scanner system trigger of the mobile tablet device is pressed by the retail store employee according to the interest of a customer at 51, via 51b. Alternatively, the employee can select the icon on the touch screen of the mobile tablet device for execution, shown at 51a. Upon pressing the button or trigger of the mobile scanner system, the appropriate application initiates communication with the EEPROM of the Main PCB, which carries a programmed instruction set and works in conjunction with the mobile application of the mobile tablet device at 52. EEPROM communicates to the mobile tablet device to initiate the appropriate application and mobile tablet device becomes ready to receive the barcode read by the scanner at 53 and the barcode is read by the scanner at 54. EEPROM interprets and parses the barcode read and formats it in a manner that is readily recognized by the appropriate application at 55. The appropriate application communicates with either the POS store system server or the ERP system to obtain the details of the product scanned at 56. The mobile tablet device displays the entire data on the screen and the retail store employee may be processing daily store inventory management tasks or working with a customer toward making a purchase decision and transacting that sale at 57. The employee can thus provide information to the client regarding the transaction and initiate a POS transaction for a direct sale with the ability to fulfill the sale by; transferring product from another store or warehouse; special order the product from a vendor or shipping product directly to a customer location. The POS store systems server software may suggest/convey to the employee other similar complimentary products; provide promotion pricing, electronic or physical coupons, customer loyalty rewards and the like at 58 and provide available inventory of product chain-wide, including the warehouse at 59. If a POS transaction is carried out, the POS store systems server sends a request to the ERP system to update the allocation of system inventory for real-time accuracy of inventory allocation. The appropriate application communicates with the POS store systems server to obtain the details of the product scanned, its selling price, any electronic or physical coupons, promotions, and customer loyalty rewards data available and the available inventory of the product chain-wide, including the warehouse. The mobile tablet device displays the entire data on the screen and the retail store employee may discuss these details with the customer allowing the customer to make a purchase decision. Optionally, the POS store systems server may suggest other similar products with enhanced functionality, reduced selling price and the like. Accordingly, the customer may view similar products and review product details to come to a purchase decision. Optionally, if the merchandise is not available in the current store's inventory, the employee may suggest the merchandise be shipped from the warehouse or another store within the chain for store pickup or delivery to a customer location.

Figure 4B:
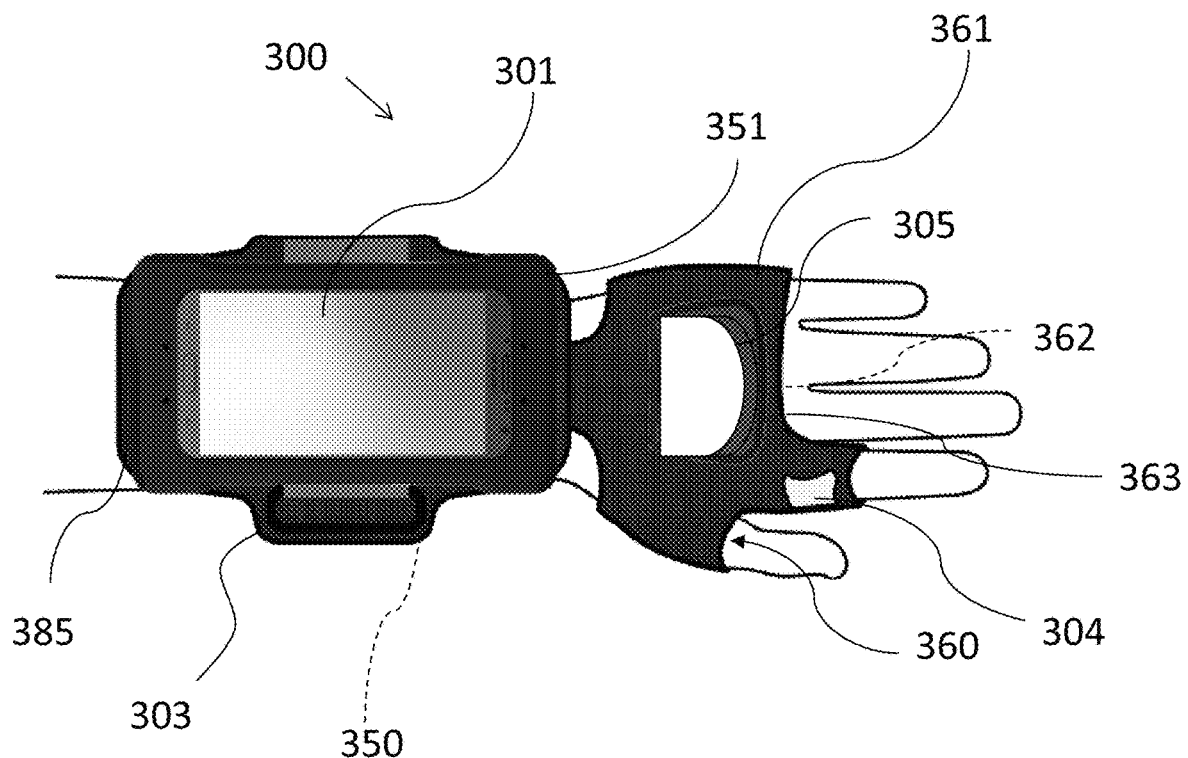
FIG. 4b illustrates a wearable mobile scanner system docked through a base mount universal receiver with rotational coupling to a mobile tablet device operating in concert under the store mobile cloud application's operation system.
Figure 4C:
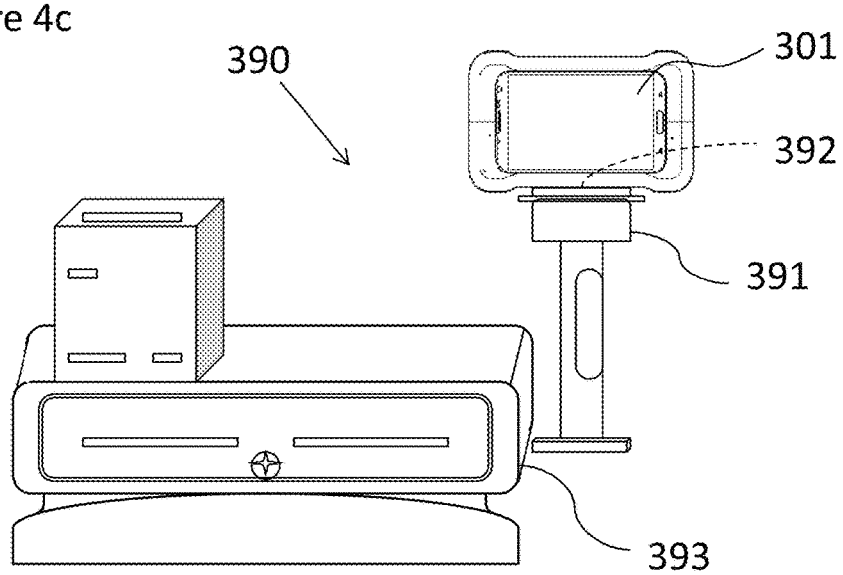
FIG. 4c illustrates a fixed register system with a mobile tablet device capability in communication with a docking station communicating through a base mount universal receiver to a mobile tablet device operating in concert under the store mobile cloud application's operation system.

FIG. 4a-4c illustrate view of the mobile scanner system assembly contemplated for use with the subject store mobile cloud application system thereof.

Referring to FIG. 4a, illustrates a side view of an embodiment of a mobile scanner gun system for processing a retail store purchase through implementation of the subject mobile application, shown generally at 1000. The mobile scanner gun system 1000 comprises a main body portion 1002 extending toward a handle portion 1003. Main body portion 1002 includes handle portion 1003, a base 1004, side walls 1005, a front wall 1006 and a back wall 1007 constructed to form an interior cavity 1008. Front wall 1006 includes an aperture 1009 with a lens 1010 recessed therein. The front wall 1006 has a trigger member 1020 located near the base 1004 of the main body. A barcode scanner 1030 is mounted above and in front of the trigger 1020. The scanner includes a scanner engine and has two drivers, including 1) a native device driver and 2) a keyboard input driver, the scanner being in communication with the trigger for initiating a scan of a barcode. An MSR 1050 is integrated within the upper receiver for carrying out and processing payment card tendering of a sales transaction. The MSR 1050 is located on the short edge of the mobile tablet device 1004 and above the scanner lens 1010. The MSR is end-to-end encrypted through to the bank card authorization processor for PCI compliance requirements. The MSR 1050 allows for direct POS action anywhere on the retail sale floor for inventory on the floor, locale warehouse, or globally throughout the retailer's enterprise, including remote locations away from the retail enterprise using wireless cellular connectivity back to a centralized POS store systems server.

Top wall 1004' of base 1004 of the main body portion includes a base mount universal receiver (female) means 1060. Attachment means 1060 comprises a base mount universal receiver with rotational coupling (male) 1061 and connector for the specialized universal serial bus wiring harness 1062 adapted to interchangeably mount and communicate with a mobile tablet device 2000 having a system integrated therein that enables real-time store level inventory management and a fully functioning mobile POS application capable of selling merchandise in a retail sales environment without restriction to physical location and the ability to sell inventory located throughout the chain. The base mount universal receiver 1061 (shown as a sliding track) includes a rotational coupler 1065 for conversion of the mobile device from portrait mode to landscape mode without operational delay of the system.

FIG. 4b illustrates an embodiment wherein the mobile scanner system is a wearable mobile scanner system docked through a base mount universal receiver with rotational coupling to a mobile tablet device operating in concert under the store mobile cloud application's StoreMobile Cloud™ (a registered trademark of Retail Technologies Corporation) environment, shown generally at 300. The wearable mobile scanner system 300 includes a forearm portion 350 and a hand portion 360. The forearm portion 350 comprises a main body member 385 and at least one strap member 303 and is adapted to secure the forearm portion upon a user's forearm. The hand portion 360 comprises a central forehand member 361, a palm member 362 (not visible from this top view, indicated by phantom line), and at least one finger aperture 363, wherein the hand portion is aligned with the forearm portion and wherein the hand portion is adapted to receive a hand of the user. A button member/button 304 is located on the inside edge of the finger aperture 363 and is operated by the thumb and is in communication with a scanner 305 mounted on the central forehand member 361 of the hand portion. An MSR 351 is provided for carrying out and processing POS. The main body member 385 of the forearm portion 350 includes an attachment means comprising a base mount universal receiver with rotational coupling means (not visible in this image) adapted to interchangeably mount and communicate with the mobile tablet device having a system integrated therein that enables real-time store level inventory management and a fully functioning mobile POS application capable of selling merchandise in a retail sales environment without restriction to physical location and the ability to sell inventory located throughout the chain.

FIG. 4c illustrates an embodiment wherein a fixed register workstation with an integrated upper receiver of the mobile scanner system in communication with a docking station communicating through a base mount universal receiver to the mobile tablet device upper receiver operating in concert under the store mobile cloud application's StoreMobile Cloud™ environment, shown generally at 390. In the embodiment shown, the mobile tablet device 301 can readily be docked on the mobile scanner gun system, or Tablet Gun™, a trademark of Retail Technologies Corporation, as discussed in FIG. 4a, on the wearable mobile scanner system or Spider Gun™, a trademark of Retail Technologies Corporation, mobile tablet device (upper receiver) discussed in FIG. 4b, or alternatively is capable of being docked at a fixed POS workstation/cash drawer or printer system 393 through the base mount universal receiver 392 within the pedestal at a docking station 391. The base mount universal receiver allows for the interchangeability between the different docking stations and provides for functionally and operation at the selected docking stations.

Figure 4D:
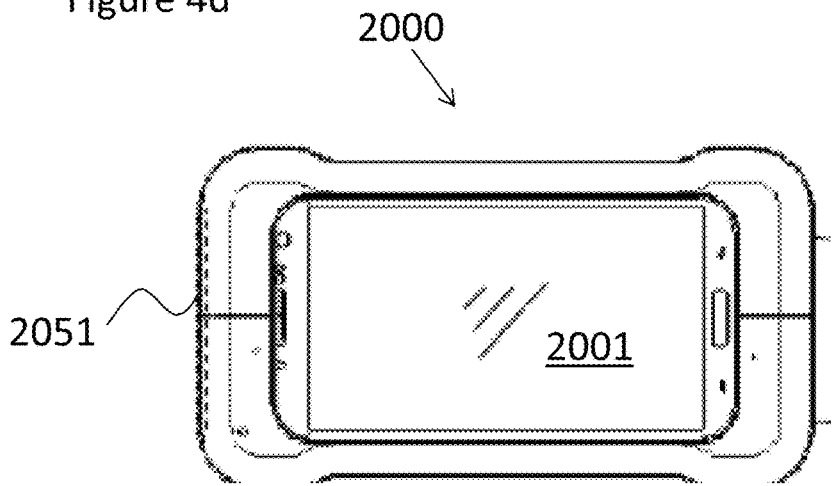
FIG. 4d-4i illustrates a "stand alone" handheld version of the mobile scanner system without a base housing. The scanner is attached to the mobile tablet device (upper receiver) through the base mount universal receiver and electrically connected through the specialized universal serial bus wiring harness connector. The mobile tablet device is operating in concert under the store mobile cloud application's operation system.
Figure 4E:
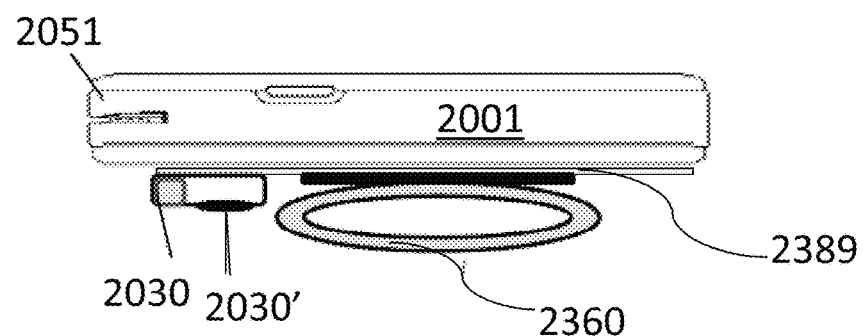
Figure 4F:
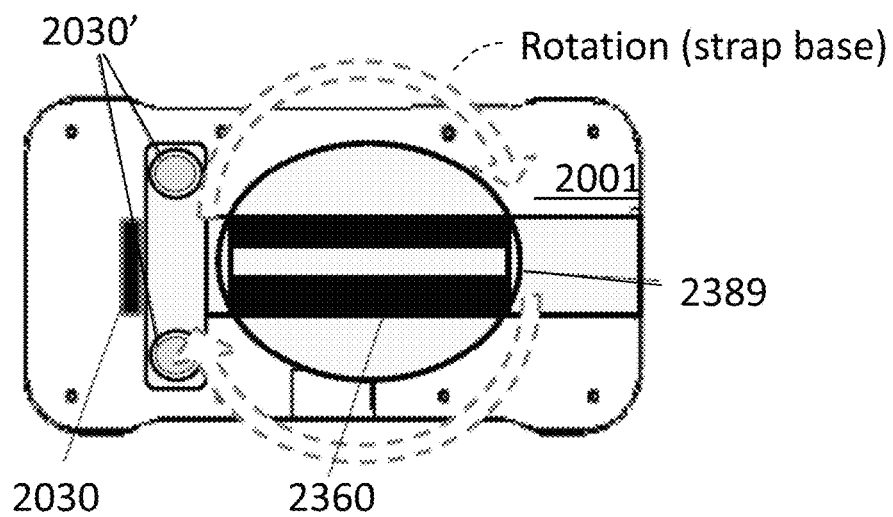

FIGS. 4d-4f illustrate views of an embodiment of a "stand alone" handheld version of the mobile scanner system without a base housing, shown generally at 2000, wherein a barcode trigger 2030' is located underneath the upper receiver. FIG. 4d illustrates a top view, FIG. 4e illustrates a side view, and FIG. 4f illustrates a bottom view. Referring to FIGS. 4d-4f, a barcode scanner 2030 with barcode trigger 2030' is mounted on a main body member 2389 having a hand strap 2360 (see FIG. 4e). In turn, the barcode scanner 2030 is mounted to a mobile tablet device 2001 (upper receiver) through a base mount universal receiver and electrically connected through the specialized universal serial bus wiring harness connector. The mobile tablet device 2001 operates in concert under the store mobile cloud application's operation system. An MSR 2051 is provided on the short side of the mobile tablet device 2001.

Figure 4G:
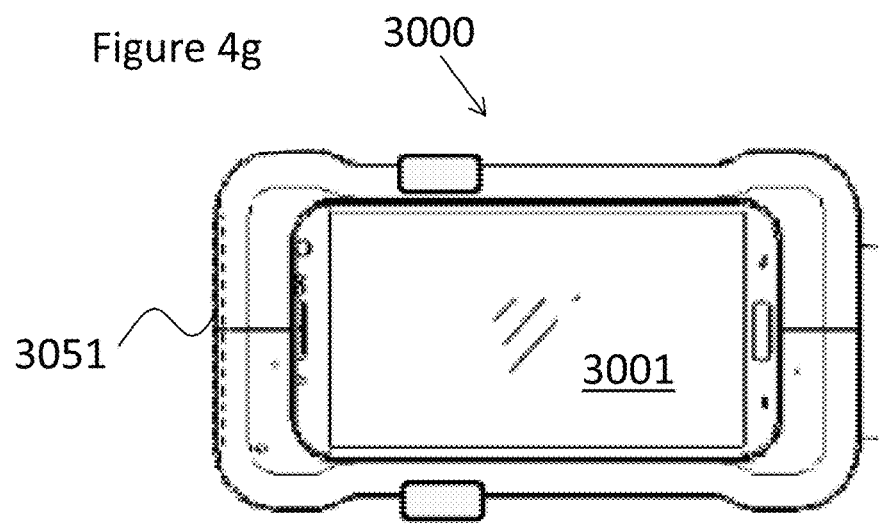
Figure 4H:
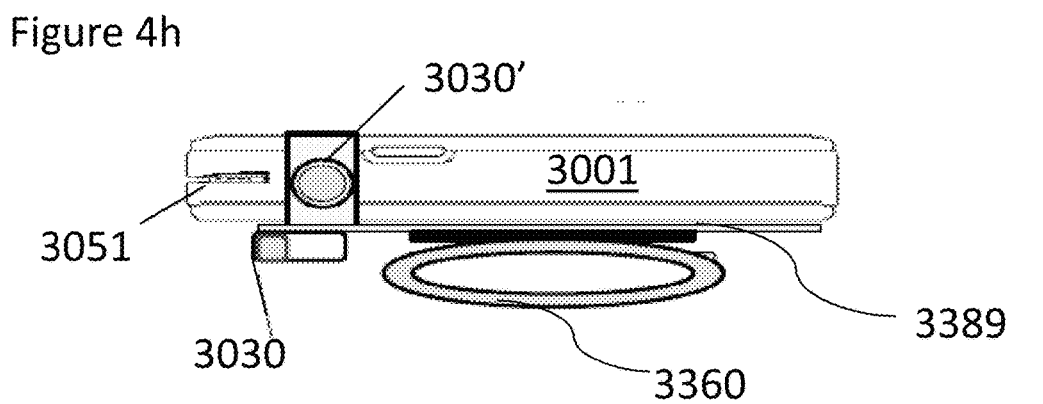
Figure 4I:
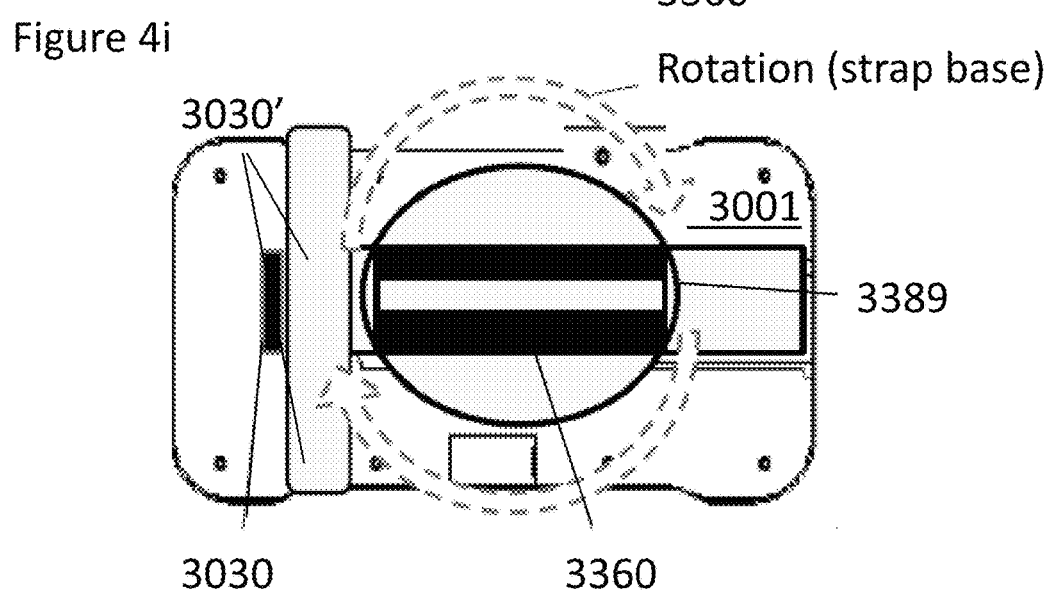

FIGS. 4g-4i illustrate views of an embodiment of a "stand alone" handheld version of the mobile scanner system without a base housing, shown generally at 3000, wherein a barcode trigger is located on a side of the upper receiver. FIG. 4g illustrates a top view, FIG. 4h illustrates a side view, and FIG. 4i illustrates a bottom view. Referring to FIGS. 4g-4i, a barcode scanner 3030 with barcode trigger 3030' is mounted on a main body member 3389 having a hand strap 3360 (see FIG. 4h). In turn, the barcode scanner 3030 is mounted to a mobile tablet device 3001 (upper receiver) through a base mount universal receiver and electrically connected through the specialized universal serial bus wiring harness connector. The mobile tablet device 3001 operates in concert under the store mobile cloud application's operation system. An MSR 3051 is provided on the short side of the mobile tablet device 3001.

There are a number of specifically designed programmed applications that allow the mobile tablet device to command the USB input devices, such as the scanner and MSR, through the specialized universal serial bus wiring harness to perform various functions typical to a scanner operation and MSR operation. Running of the specially programmed mobile POS application, or StoreMS Mobile™, a trademark of Retail Technologies Corporation, is initiated, and a command is sent to the EEPROM to acquire a barcode scan. The mobile tablet device in this mode is ready to receive the barcode data from the scanner and communicates with the POS store systems server at the retail facility to obtain specific product information such as, product availability within the store and chain, price and any promotions available, available electronic and physical coupons and customer loyalty data and rewards available. The employee of the retail organization presents the data that is related to the particular item of interest to the customer. When the customer decides to purchase the particular item scanned, the employee of the retail organization uses the StoreMS Mobile™ application to process the sales transaction, if needed for shipping, enrollment or updating customer records, entry of the customer's pertinent information is taken if they are not already an updated loyalty rewards customer. At tender, this POS transaction can open the cash drawer wirelessly for cash transactions and can also launch a request for processing the sale using a customer payment card. The customer's payment card is swiped via the MSR, which is located on the short edge of the mobile tablet device. All pertinent payment card data is encrypted by the MSR and the EEPROM communicates the encrypted data through the specialized universal serial bus wiring harness to the mobile tablet device. The StoreMS Mobile™ present in the mobile tablet device communicates all pertinent customer payment card data, using a PCI compliant encrypted wireless connection, to the POS store systems server. The POS store systems server contacts the bank card processor for authorization of the payment card for the purchase. If the purchase is authorized, this information is sent to the mobile tablet device display screen for customer signature using an integrated signature capture application built within the mobile POS application on the mobile tablet device and the customer is allowed to take possession of the merchandise purchased. The receipt for this purchase can be printed on the store network receipt printer and/or sent by e-mail to the customer by the POS store systems server. The POS store systems server records this purchase and adjusts the inventory data for the particular merchandise sold through the corporate ERP system real-time, systemically becoming visible chain-wide. If the credit purchase is denied, the mobile tablet device displays this credit request decline. The employee of the retail organization informs the customer of this credit purchase rejection and requests another form of payment. Thus the purchase of a product by a customer is accomplished by the mobile POS application by an employee having a mobile scanner system anywhere in the retail establishment, without the customer having to bring the product to a sales counter and wait in line at the counter to consummate the purchase; and the inventory of any item in the retail establishment is always current and available for purchase transactions carried out by a plurality of sales personnel working with a plurality of customers at a wide variety of locations within the retailers chain of stores.

Figure 5:
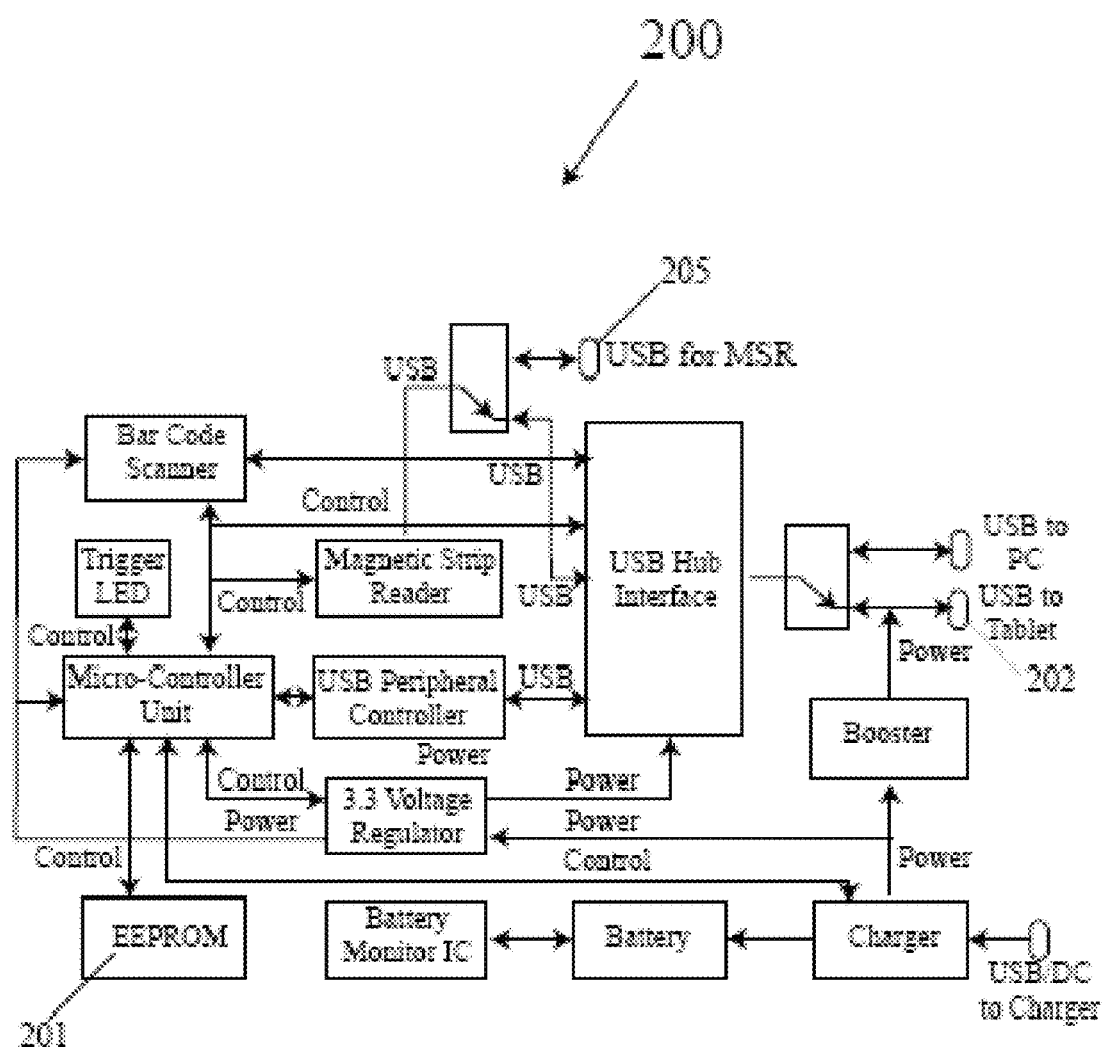
FIG. 5 is a schematic diagram illustrating the circuit of the Main PCB.

A key feature of the invention is an EEPROM that has a previously programmed instruction set present within the Main PCB. The schematic diagram of the Main PCB is shown in FIG. 5 at 200. The EEPROM is shown at 201 and is connected to the mobile tablet device at 202 and can process the command issued by the mobile applications to command either the barcode scanner or the MSR to acquire pertinent data. The mobile tablet device has several mobile applications accessed by icons on the mobile tablet device screen and has functionality to communicate wirelessly via Wi-Fi or wireless cellular with a POS store systems server or directly to the corporate ERP system depending on the particular mobile application and this communication is secured using standard WPA or WPA2 wireless encryption methods. When the payment card transaction is approved by the bank card authorization processor, the appropriate encrypted payment card information is wirelessly transmitted via an encrypted communication to the POS store systems server within the store. Unless credit is denied, the purchase is authorized and is sent to the mobile tablet device display screen for customer signature using an integrated signature capture application built within the mobile POS application on the mobile tablet device and the customer is given the purchased merchandise. The receipt for this purchase can be printed on the store network receipt printer and/or sent by e-mail to the customer. The POS store systems server sends a request to the ERP system to update appropriate allocated inventory for merchandise sold and not available in its store. The ERP system processes that request and updates the corporate inventory databases, which are accessible chain-wide.

Due to the use of the EEPROM, which can process barcode and payment card data, the attached mobile tablet device can perform secure distributed sales within a retail establishment. Through the mobile POS application, all store employees know instantaneously the available inventory of any particular item across the chain; any product and its particular details can be reviewed with the customer and sold regardless of the products availability in the store ringing the sale. Thus a customer may look at a variety of products and ask the sales person its price, detailed product description, as well as any coupons or promotions that are available. This provides a friendly, efficient and informative interaction between the customer and the retail salesperson; it establishes a one-on-one face-to-face relationship, which is appreciated by the customer and is conducive to an improved sales environment.

Figure 6:
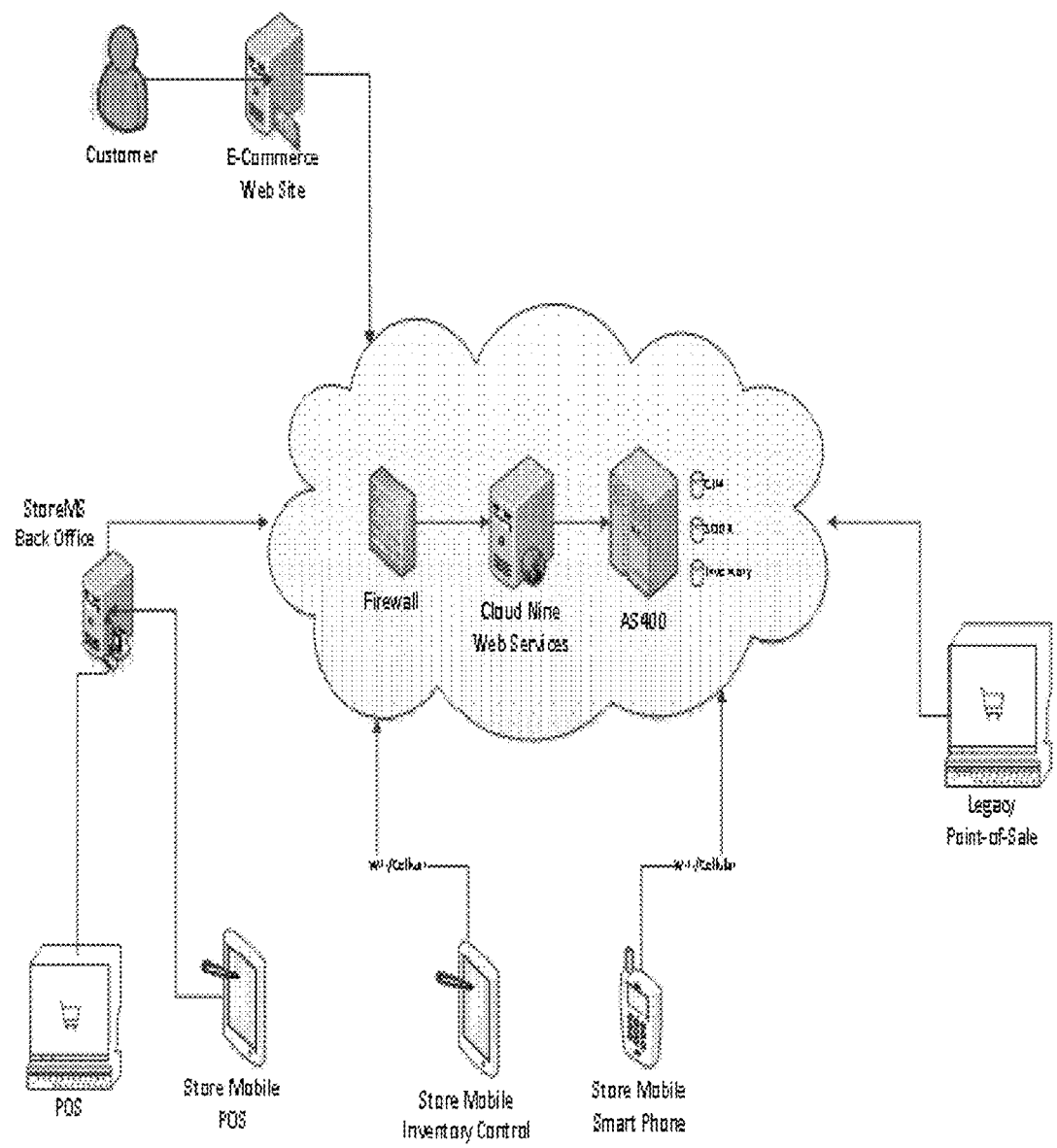
FIG. 6 is a schematic diagram illustrating an embodiment of the StoreMobile Cloud™ environment of the subject system and method.
Figure 7:
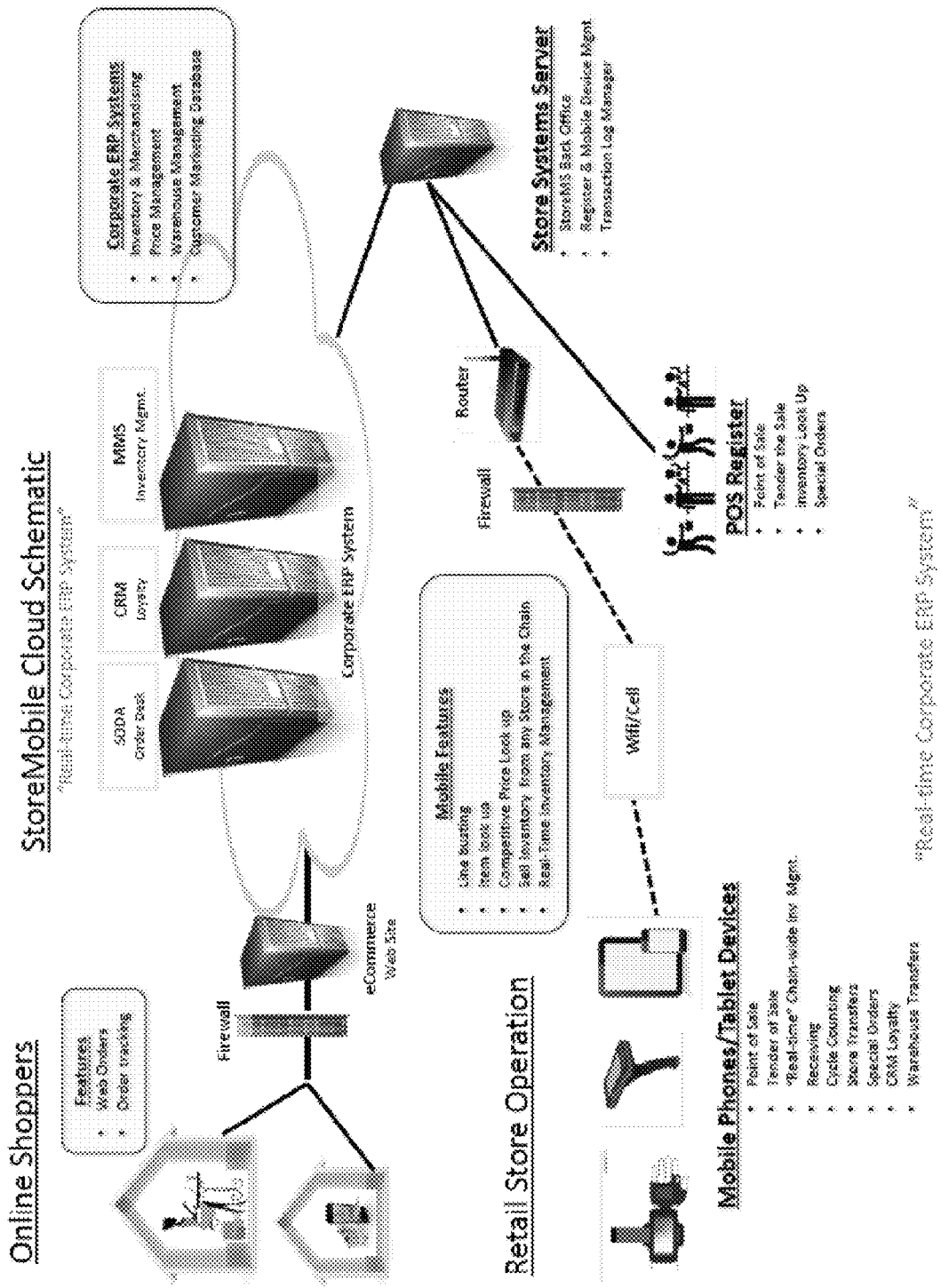
FIG. 7 is an in-depth schematic diagram illustrating an embodiment of the StoreMobile Cloud™ network schematic of the subject system and method.
Figure 8:
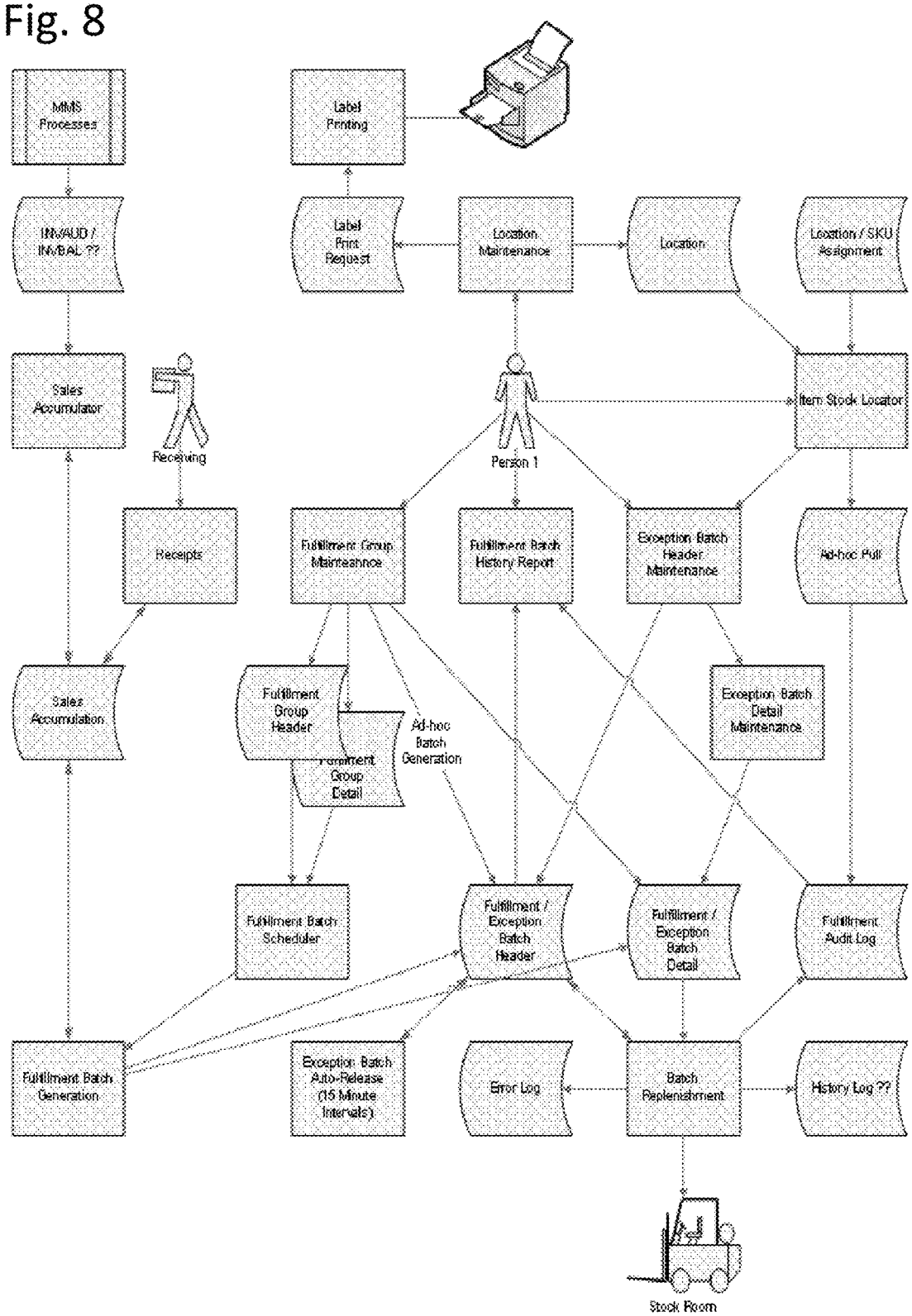
FIG. 8 is a flow chart diagram illustrating an embodiment of the back room management picture flow of the subject system and method.

FIG. 6 is a schematic diagram illustrating an embodiment of the StoreMobile Cloud™ environment of the subject system and method. FIG. 7 is an in-depth schematic diagram illustrating an embodiment of the StoreMobile Cloud™ environment of the subject system and method. FIG. 8 is a flow chart diagram illustrating an embodiment of the back room management picture flow of the subject system and method. Referring generally to FIGS. 6-8, generally a three-phased approach is implemented by the subject system and method.

In phase I of building the StoreMobile Cloud™ environment, the central ERP inventory management applications relating to the store are mobilized through the subject system's StoreMobileRF™, a trademark of Retail Technologies Corporation, application. As a result of the system's StoreMobileRF™ application, retailers can manage store inventory in real-time fashion, connected directly to their corporate ERP system from a USB scanner input device in any store.

In phase II of building the StoreMobile Cloud™ environment, POS and related store systems are fully operational so that POS customer check-out is mobilized through its StoreMS Mobile™, at trademark of Retail Technologies Corporation, application. The system's StoreMS Mobile™ application works alongside the system's StoreMobileRF™. Access to the internet, StoreMS Loyalty™, StoreMS Gift Card™, trademarks of Retail Technologies Corporation, and end to end encrypted payment card processing are standard features of the mobile scanner gun system's StoreMS Mobile™ application. Advantageously, StoreMS Mobile™ excels at "line busting", reducing overall store register count, or completely replacing all fixed POS cash wrap stations.

In Phase III of building the StoreMobile Cloud™ environment, StoreMobileRF™ and StoreMS Mobile™ applications are both up and running together, with StoreMS Mobile™ directly accessing the POS store systems server and StoreMobileRF™ directly accesses the corporate ERP system. StoreMS Mobile additionally can now access the corporate ERP system for pertinent inventory availability throughout the chain and sell, transfer, and special order merchandise not available in its own store through the corporate ERP system. Further, the allocation of inventory for these special POS transactions is visible chain-wide through the StoreMobileRF™ application.

Figure 9A:
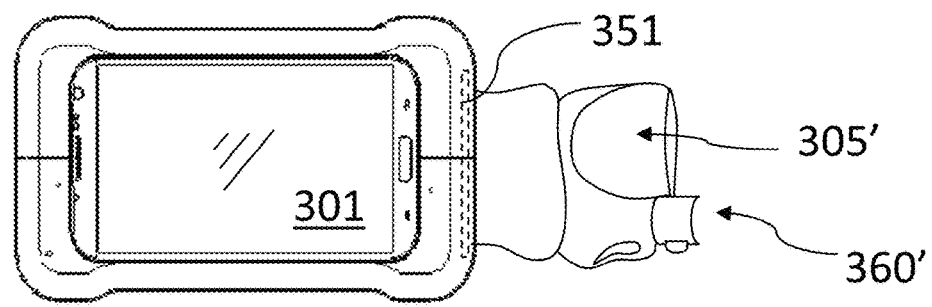
FIG. 9a illustrates a top view of an embodiment of the frame/casing around the wearable mobile scanner device with the mobile applications downloaded thereon.
Figure 9B:
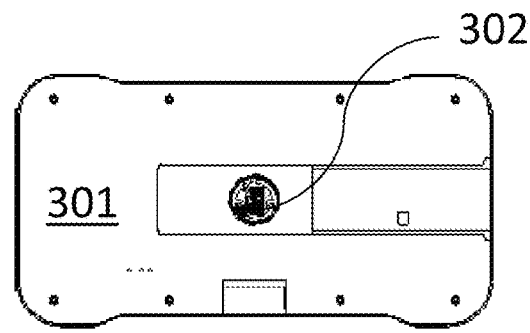
FIG. 9b illustrates a bottom view of an embodiment of the frame/casing around a mobile tablet device with the mobile applications downloaded thereon.

FIGS. 9a-9b illustrates views (front and back) of an embodiment of the frame/casing around a wearable mobile tablet system with the mobile applications downloaded thereon. The mobile tablet device 301 is connected to a wearable base housing 302, which may have a rotatable element that permits the alignment of the mobile tablet device in the portrait mode or landscape mode. An MSR 351 is provided for carrying out and processing POS sales transactions. The wearable base housing (FIG. 9a) includes a hand portion 360' provided with a scanner 305' mounted thereon. The mobile tablet device 301 is connected to the base mount universal receiver with rotational coupling via rotatable element of wearable base housing 302 adapted to interchangeably mount the mobile tablet device and provides communication between the mobile tablet device and mobile scanner system implementing the store mobile cloud application system.

FIG. 10 is a schematic diagram illustrating an embodiment of the circuit of the Main PCB in communication with the mobile tablet device and supporting initiation of the subject store mobile cloud application system, shown generally at 6000. Main PCB 6001 is shown. Main PCB 6001 includes a battery 6002, Magtek MSR terminal 6003, USB to mobile tablet device 6004, USB to PC 6005, 5 A DC jack 6006, Battery LED 6007, MSR LED 6008 (preferably via 3 pins) and connection to sub-board at 6009.

Figure 11:
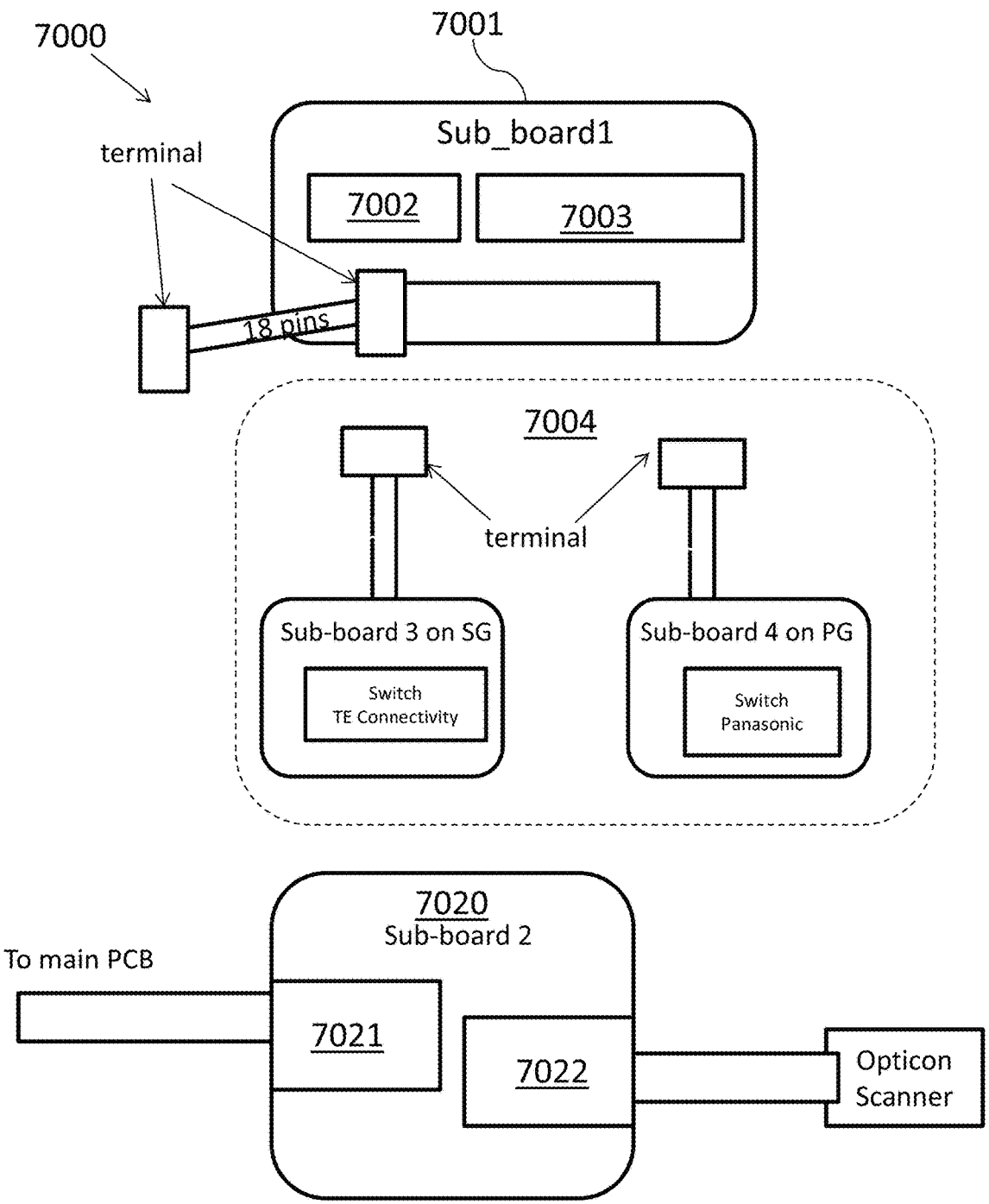
FIG. 11 is a schematic diagram illustrating an embodiment of the sub-boards 1 and 2 circuitry of the barcode scanner in communication with the mobile tablet device and supporting initiation of the subject store mobile cloud application system.

FIG. 11 is a schematic diagram illustrating an embodiment of the sub-boards 1 and 2 circuitry of the mobile scanner system in communication with the mobile tablet device and supporting initiation of the subject store mobile cloud application system, shown generally at 7000. Sub board 1 is shown generally at 7001. Sub board 1 includes a USB for MSR 7002 and scanner/trigger (16 pin) 7003, and the specialized universal serial bus wiring harness terminal 7004 (preferably 18 pins) with sub board 3 on SG (switch) and sub board 4 on PG (switch). Sub board 2 is shown generally at 7020. Sub board 2 includes a main PCB 7021 and Opticon scanner 7022.

Figure 12:
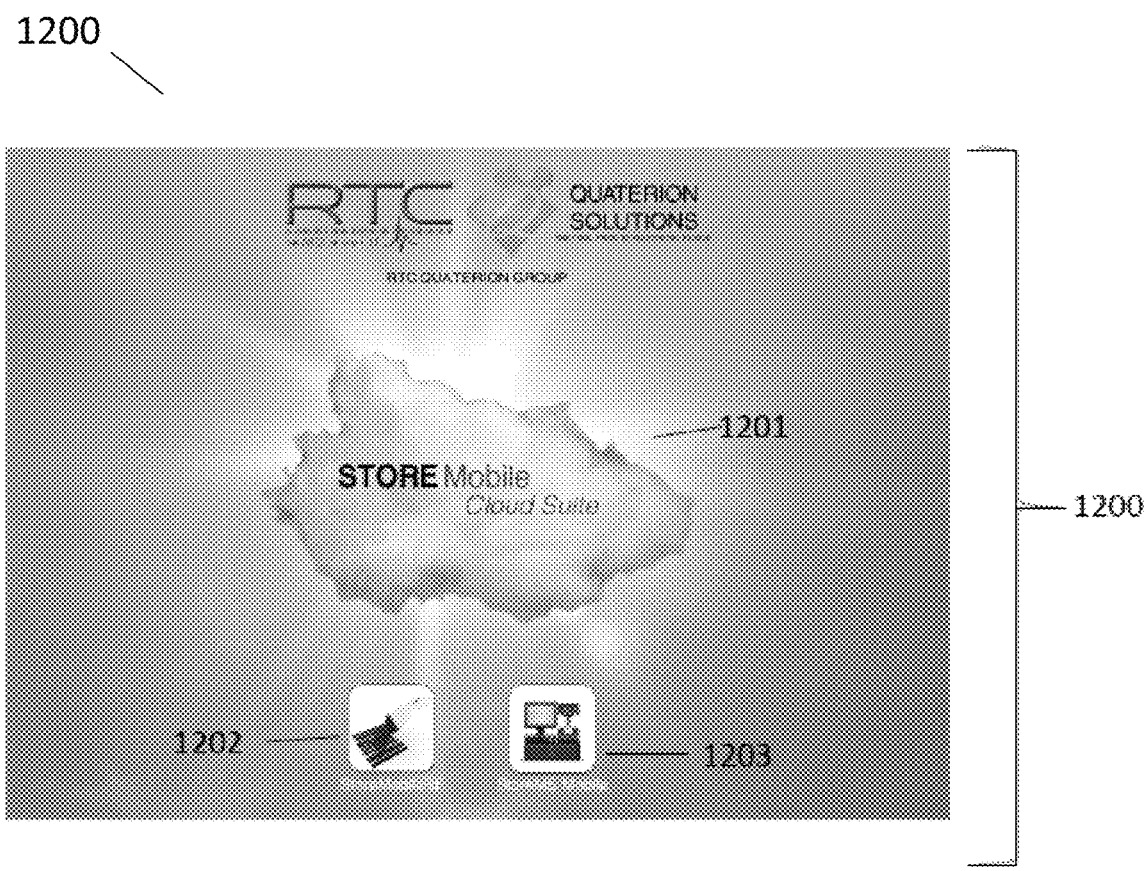
FIG. 12 is an embodiment of a screen shot of the subject application system illustrating the StoreMobile Cloud™ environment, StoreMobileRF™ and StoreMS Mobile™ applications.

FIG. 12 is an embodiment of a screen shot of the main menu regarding the subject application system illustrating the StoreMobile Cloud™ mobile application suite shown generally at 1200. The StoreMobile Cloud™ icon is displayed on the mobile device's screen, and is shown at 1201, representing the StoreMobile suite of applications. Within the StoreMobile Suite, there are two application icons displayed. The first is StoreMobileRF™ 1202 and the second is for StoreMS Mobile™ 1203.

Figure 13:
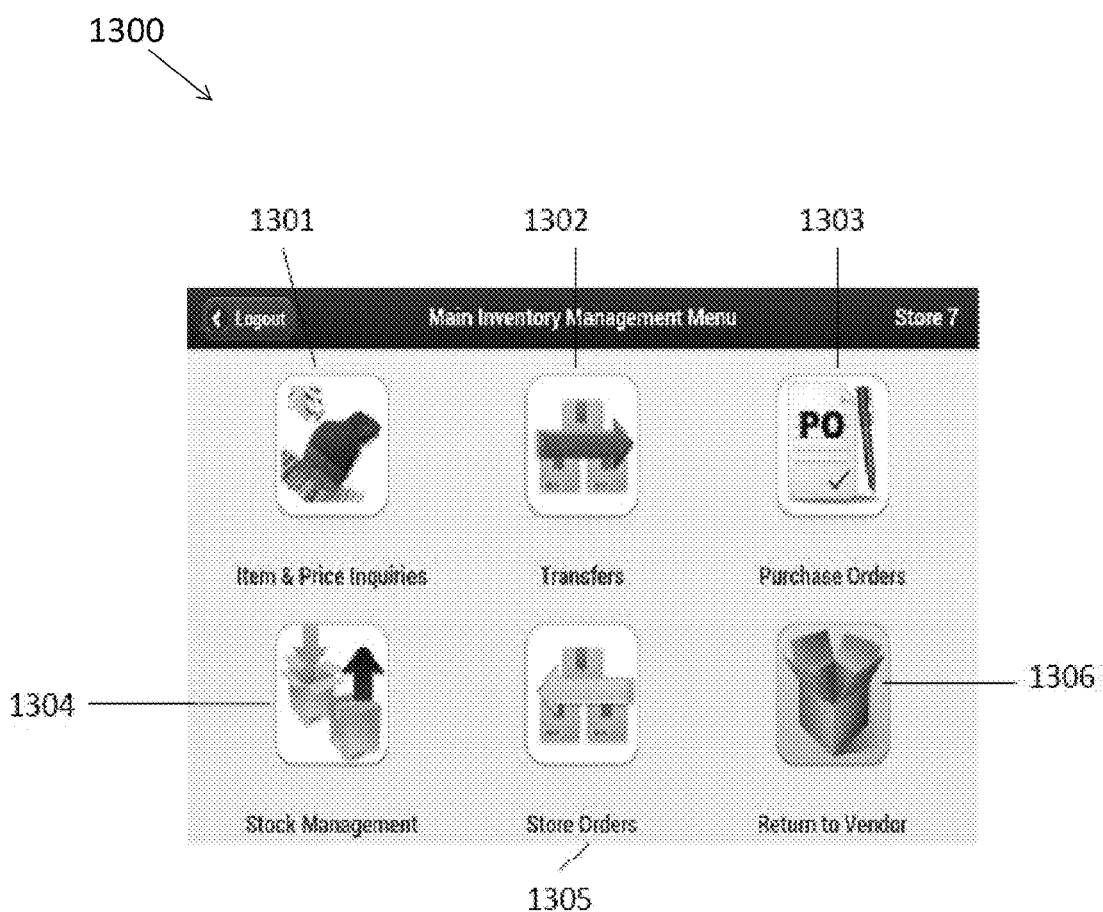
FIG. 13 is a screen shot illustrating a representation of the menu screen after selection of the StoreMobileRF application system's icon 1202 in FIG. 12.

FIG. 13 is a screen shot representing inventory management applications within StoreMobileRF™, shown generally at 1300: Item and Price Inquiry 1301; Transfers 1302; Purchase Orders 1303; Stock Management 1304; Store Orders 1305; Return to Vendor 1306.

FIG. 14 is a screen shot illustrating a representation of StoreMS Mobile™ application screen, shown generally at 1400.

Figure 15:
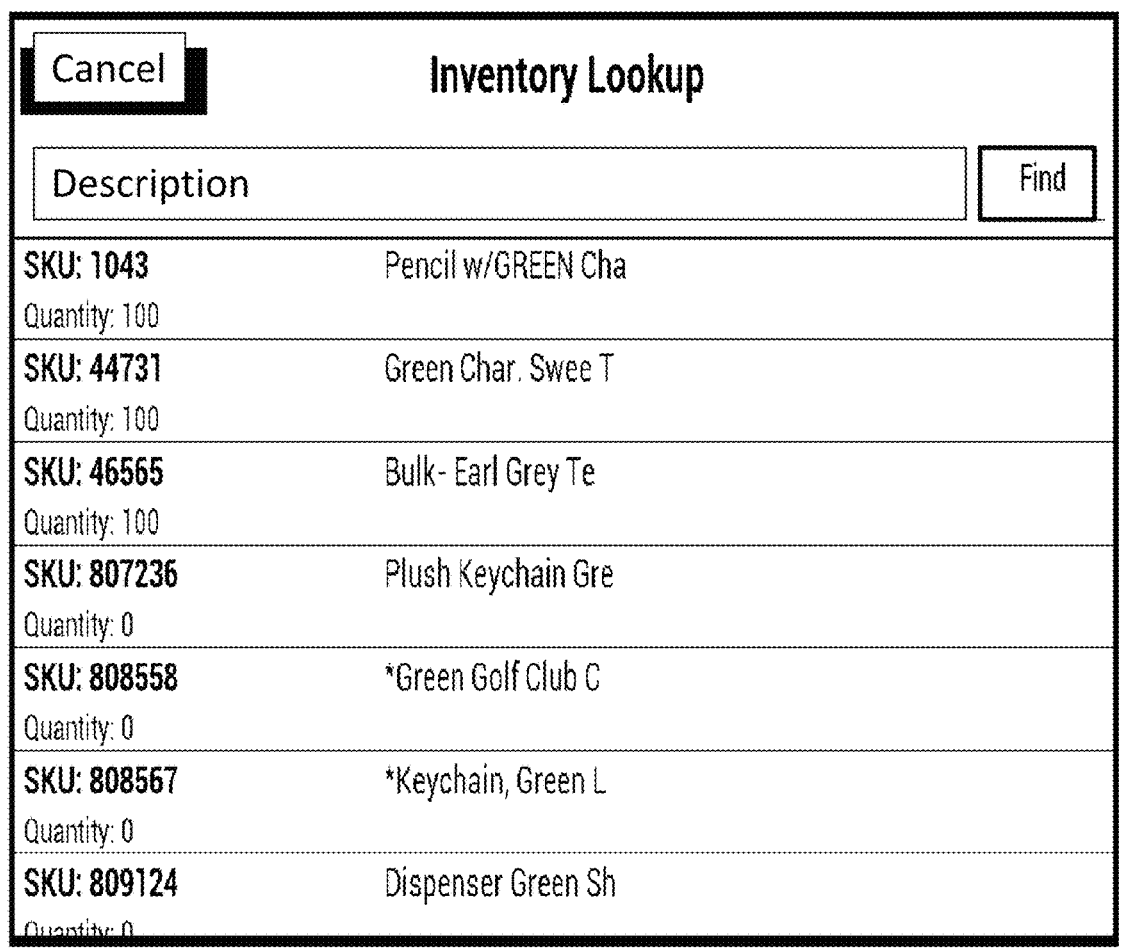
FIG. 15 is a screen shot illustrating a representation of an inventory lookup screen.

FIG. 15 is a screen shot illustrating a representation of an inventory lookup screen within StoreMS Mobile™, shown generally at 1500.

Figure 16:
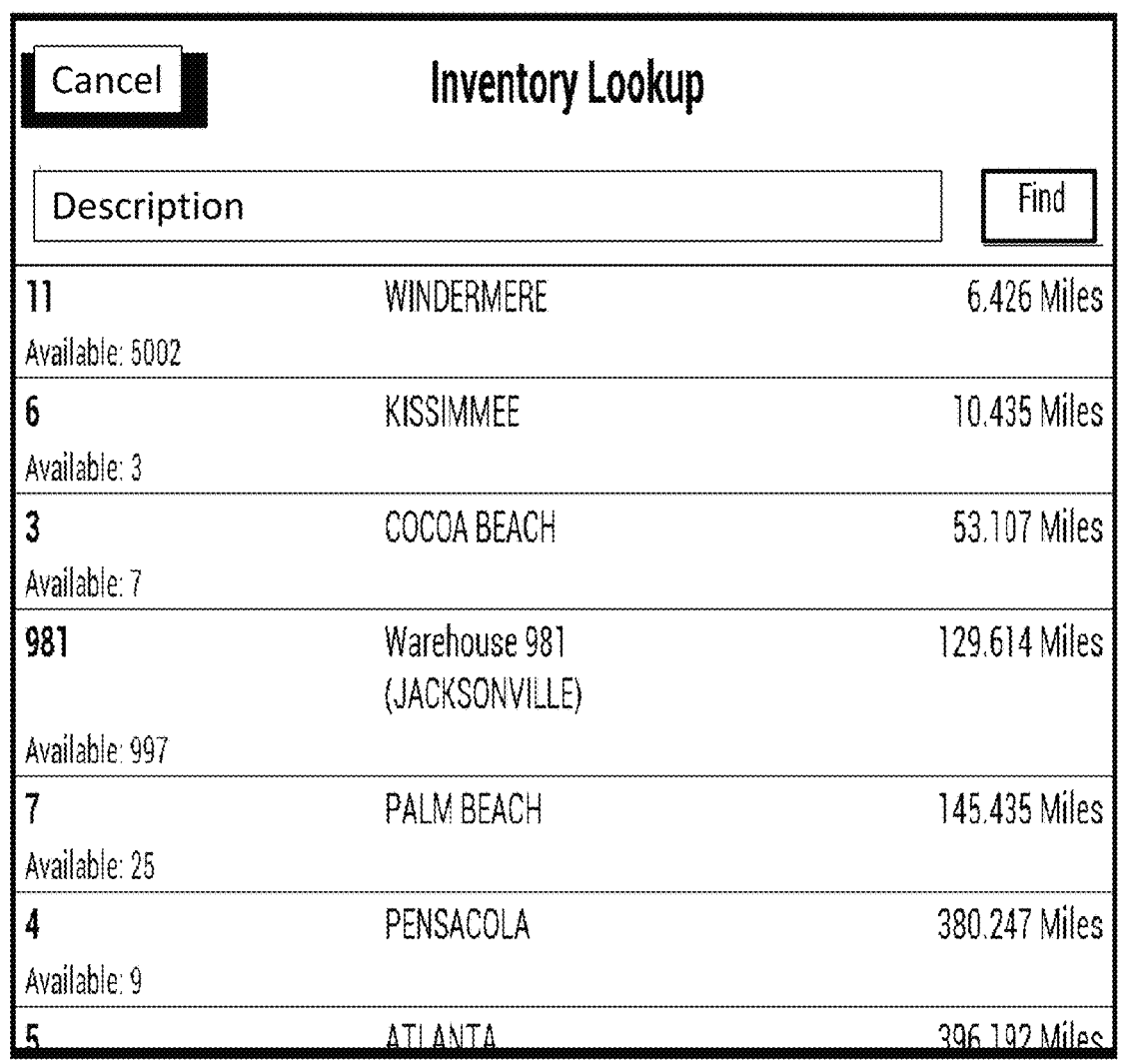
FIG. 16 is a screen shot illustrating a representation of an inventory proximity search screen.

FIG. 16 is a screen shot illustrating a representation of a store inventory lookup including inventory availability and proximity of each store, shown generally at 1600.

FIG. 17 is a screen shot illustrating a representation of an electronic email receipt screen, shown generally at 1700.

Figure 18:
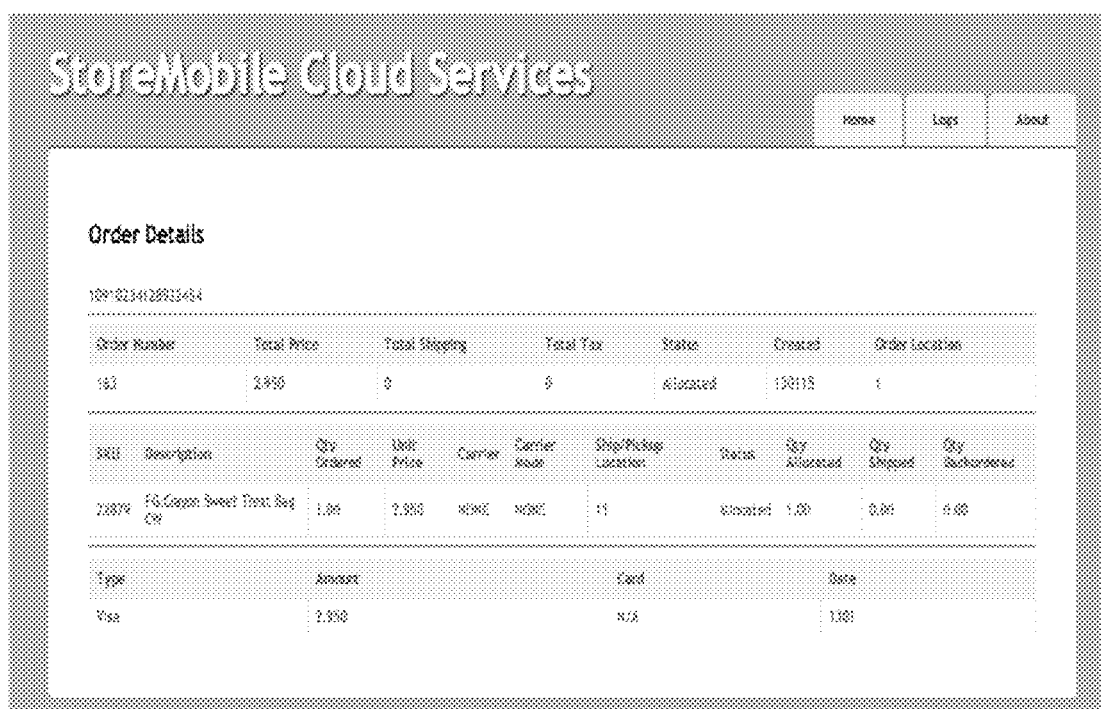
FIG. 18 is a screen shot illustrating a representation of a web order view screen.

FIG. 18 is a screen shot illustrating a representation of a web order view screen, shown generally at 1800.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An improvement in database storage and retrieval systems for retail point of sale (POS) computer-based systems, said improvement comprising a store mobile cloud application and a specialized universal serial bus wiring harness operable through a mobile tablet device having a display screen and a Wi-Fi or wireless cellular connectivity back to a central corporate Enterprise Resource Planning (ERP) system and point of sale (POS) store systems server, in communication with a mobile scanner system and incorporating mobile applications for managing real-time store level inventory and transacting retail store purchases for customers, comprising:

a) mobile applications associated with said corporate ERP system and POS store systems server, connected and operated via encrypted Wi-Fi or wireless cellular connectivity relating to real-time store level inventory management and mobile POS sales transactions within the store environment, wherein said mobile applications are available to either manage real-time daily store level inventory management directly accessing said corporate ERP system and visible chain-wide or process POS transactions for customer purchases including selling merchandise unavailable within an operating store from any other store or warehouse within a retail chain, wherein once said POS transaction is completed sold merchandise is allocated and updated within said corporate ERP system and systemically visible chain-wide;

b) wherein said mobile application displays: i) real-time store inventory data and management applications associated with software that provides entry of daily store level inventory management directly connected to said corporate ERP system; and ii) displays POS sales data and transaction means associated with said POS store systems server that provides ability to carry out sales transactions within said mobile application throughout said operating store or beyond its walls regardless of physical location;

c) said mobile applications being connected through said Wi-Fi or wireless cellular connectivity back to host applications running on the corporate ERP system and the POS store systems server, providing the user interface for said host applications and operating on said mobile scanner system for both real-time daily store level inventory management and POS customer sales transactions throughout the store and beyond its walls;

d) said mobile applications being operative to establish a Wi-Fi or wireless cellular connection between said mobile scanner system and said software;

e) said mobile tablet device being attached to Universal Serial Bus (USB) input devices, such as a scanner and Magnetic Strip Reader (MSR), of said mobile scanner system through a base mount universal receiver adapted to removably mount said mobile tablet device on said Universal Serial Bus (USB) input devices through said specialized universal serial bus wiring harness to effect communication between said scanner and mobile tablet device and enable real-time store level inventory management and mobile POS sales transaction data transfer;

f) said Main Printed Circuit Board (PCB) having a previously programmed Electrically Erasable Programmable Read-Only Memory (EEPROM) that is initiated through execution of said store mobile cloud application system for controlling all actions of said USB scanner and a gun trigger for activating a scan operation of an item of interest to a customer by an employee of a retail establishment;

g) said store mobile cloud application system activated by initiation through selection of said icon causing said EEPROM of the Main PCB to communicate with said mobile tablet device, launching said mobile applications to ready said mobile tablet device for receiving a scanned barcode;

h) said Main PCB having said previously programmed EEPROM that is initiated through execution of said store mobile cloud application system for controlling all actions of said USB MSR input device for activating an MSR operation through the swipe of a customer payment card, initiating a Payment Card Industry (PCI) secured payment card authorization through the bank card processor by an employee of a retail establishment;

i) said mobile applications communicating with said ERP system to obtain detailed information for real-time daily store level inventory management purposes for such tasks as physical inventory, cycle counting, inventory receiving, store to store transfers, return to vendor and product re-ticketing;

j) said mobile applications communicating with said store systems server to obtain specific product information such as, product availability within the store and chain, price and any promotions available, available electronic and physical coupons and customer loyalty information;

k) said mobile applications enables mobile POS application and executes authorization of electronic payment card transactions;

l) said mobile applications communicating said POS to said POS store systems server and initiating allocation of said product inventory unavailable in the store and sold from within the chain, sending a receipt therefor to the e-mail address of the customer if requested and/or printing a hard copy of the transaction on a central printer in the store;

l) providing said specialized universal serial bus wiring harness attachment through said base mount universal receiver to interchangeably mount and communicate with said mobile tablet device, said base mount universal receiver allowing for interchangeability between different docking stations and providing for functionally and operation at said different docking stations while functioning to communicate with both said corporate ERP system and said point of sale (POS) store systems server;

whereby the customer purchases a product from any retail store employee having a mobile scanner system receiving full product details, price, promotions, electronic and physical coupons, customer loyalty data and rewards and then charges the purchase in a friendly, efficient, informative atmosphere without having the need to bring the product to a central checkout station and waiting in queue to check out.

2. The store mobile cloud application system as recited by claim 1, wherein said mobile tablet device is removably connected to one of four said base housings through a base mount universal receiver with rotatable coupling.

3. The store mobile cloud application system as recited by claim 2, wherein said rotation sets the mobile tablet device in portrait or landscape viewing format.

4. The store mobile cloud application system as recited by claim 1, wherein said wireless communication may be in the form of Wi-Fi through a plurality of links located within the retail establishment and beyond its walls or wireless cellular through a data planned offered by a standard cellular carrier.

5. The store mobile cloud application system as recited by claim 1, wherein said mobile applications includes a StoreMobileRF application wherein input of real-time daily store level inventory management is inputted and stored for managing inventory from a mobile scanner system in any store location across the retail chain.

6. The store mobile cloud application system as recited by claim 1, wherein said mobile applications includes a StoreMS Mobile application for retail store chain-wide POS transactions of said merchandise for customer check-out of purchased goods.

7. The store mobile cloud application system as recited by claim 6, wherein said StoreMS Mobile application provides access to StoreMS Customer Loyalty Rewards data, StoreMS Gift Card, and end to end encrypted payment card processing networked to a PCI certified bank card processor.

8. The store mobile cloud application system as recited by claim 1, wherein said mobile tablet device is a mobile phone, Smartphone, or custom OEM mobile tablet device.

9. The store mobile cloud application system as recited by claim 1, wherein said mobile device is a mobile tablet device.

10. The store mobile cloud application system as recited by claim 1, wherein said mobile tablet device is received within a scan gun form, wearable forearm form, handheld form or stationary docking station associated with a POS retail register form.

11. The store mobile cloud application system as recited by claim 1, wherein said mobile scanner system is comprised of a mobile scanner gun system and includes a base mount universal receiver with rotational coupling thereon for removable mounting and communication with said mobile tablet device.

12. The store mobile cloud application system as recited by claim 1, wherein said mobile scanner system is comprised of a wearable mobile scanner system and includes a base mount universal receiver with rotational coupling thereon for removable mounting and communication with said mobile tablet device.

13. The store mobile cloud application system as recited by claim 1, wherein said mobile scanner system is comprised of a docking station in communication with a POS register station and includes a base mount universal receiver thereon for removable mounting and communication with said mobile tablet device.

14. The store mobile cloud application system as recited by claim 1, wherein said mobile scanner system is comprised of a handheld mobile scanner system and includes USB communication through a specialized universal serial bus wiring harness between the mobile tablet device and USB input devices, such as a barcode scanner and MSR.

15. An improvement in database storage and retrieval systems for retail point of sale (POS) computer-based systems, said improvement comprising a store mobile cloud application system providing a non-transitory computer readable electronic storage medium storing one or more programs comprising instructions executable through a specialized universal serial bus wiring harness by a portable multifunction mobile tablet device having a touch screen display and Wi-Fi or wireless cellular capability to cause the mobile tablet device to: display real-time store inventory data and management applications associated with software that provides entry of daily store level inventory management directly connected to a central Enterprise Resource Planning (ERP) system; display point of sale (POS) data and sales transaction means that provides ability to carry out sales transactions throughout said store or beyond its walls regardless of physical location; enabling the portable multifunction mobile tablet device to be operative to establish a connection between the mobile tablet device and one of four base housings and to be mountable thereon; wherein said mobile tablet device is enabled to be removably attached to Universal Serial Bus (USB) input devices, such as a scanner and Magnetic Strip Reader (MSR), through a base mount universal receiver adapted to removably mount said mobile tablet device on said Universal Serial Bus (USB) input devices through said specialized universal serial bus wiring harness enabling communication between said scanner and mobile tablet device and real-time store level inventory management and mobile POS sales transaction data transfer; providing said specialized universal serial bus wiring harness attachment through said base mount universal receiver to interchangeably mount and communicate with said mobile tablet device, said base mount universal receiver allowing for interchangeability between different docking stations and providing for functionally and operation at said different docking stations while functioning to communicate with both said corporate ERP system and said point of sale (POS) store systems server; wherein said programs are available to either manage real-time daily store level inventory management directly accessing said corporate ERP system and visible chain-wide or process POS transactions for customer purchases including selling merchandise unavailable within an operating store from any other store or warehouse within a retail chain, wherein once said POS transaction is completed sold merchandise is allocated and updated within said corporate ERP system and systemically visible chain-wide; wherein when triggered the system provides relevant inventory information and POS transaction capability.

* * * * *